(12) United States Patent
Ebara et al.

(10) Patent No.: US 7,895,405 B2
(45) Date of Patent: *Feb. 22, 2011

(54) SEMICONDUCTOR MEMORY CARD, AND PROGRAM FOR CONTROLLING THE SAME

(75) Inventors: Hiromi Ebara, Hiroshima (JP); Shinji Kawano, Hiroshima (JP); Futoshi Nakabe, Hiroshima (JP)

(73) Assignee: Panasonic Corporation, Osaka (JP)

( * ) Notice: Subject to any disclaimer, the term of this patent is extended or adjusted under 35 U.S.C. 154(b) by 62 days.

This patent is subject to a terminal disclaimer.

(21) Appl. No.: 12/403,885

(22) Filed: Mar. 13, 2009

(65) Prior Publication Data

US 2009/0182937 A1 Jul. 16, 2009

Related U.S. Application Data

(62) Division of application No. 10/532,988, filed as application No. PCT/JP2004/000961 on Jan. 30, 2004, now Pat. No. 7,526,625.

(30) Foreign Application Priority Data

Jan. 31, 2003 (JP) ............................. 2003-024167

(51) Int. Cl.
*G06F 12/00* (2006.01)
(52) U.S. Cl. ..................................... 711/163; 711/103
(58) Field of Classification Search ................ None
See application file for complete search history.

(56) References Cited

U.S. PATENT DOCUMENTS

| | | | |
|---|---|---|---|
| 4,853,522 A | 8/1989 | Ogasawara | |
| 5,500,949 A | 3/1996 | Saito | |
| 5,504,818 A | 4/1996 | Okano | |
| 5,623,637 A | 4/1997 | Jones et al. | |
| 5,721,781 A | 2/1998 | Deo et al. | |

(Continued)

FOREIGN PATENT DOCUMENTS

DE 4115152 11/1992

(Continued)

OTHER PUBLICATIONS

International Search Report issued Jun. 18, 2004 in the International Application No. PCT/JP2004/000961.

(Continued)

*Primary Examiner*—Reginald G Bragdon
*Assistant Examiner*—Eric Loonan
(74) *Attorney, Agent, or Firm*—Wenderoth, Lind & Ponack, L.L.P.

(57) ABSTRACT

A semiconductor memory card that has a sufficient storage capacity when an EC application writes data to a storage is provided. A usage area for the EC application in an EEPROM 3 in a TRM 1 is expanded. The expansion is such that a partition generated in a flash memory 2 outside the TRM 1 is assigned to the EC application while a partition table is allocated in the internal EEPROM 3. Because the partition table is in the TRM 1, only a CPU 7 in the TRM 1 is able to access the generated partition table. Secrecy of stored contents increases because the access to the expanded area is limited to the CPU 7 in the TRM 1.

10 Claims, 23 Drawing Sheets

U.S. PATENT DOCUMENTS

| | | |
|---|---|---|
| 6,886,069 B2 | 4/2005 | Kawamura |
| 7,162,645 B2 | 1/2007 | Iguchi et al. |
| 2001/0019614 A1 | 9/2001 | Madoukh |
| 2002/0169960 A1 | 11/2002 | Iguchi et al. |
| 2004/0177215 A1 | 9/2004 | Nagamasa et al. |

FOREIGN PATENT DOCUMENTS

| | | |
|---|---|---|
| DE | 19536206 | 4/1996 |
| EP | 0 792 044 | 8/1997 |
| EP | 0 856 818 | 8/1998 |
| EP | 1 050 887 | 11/2000 |
| EP | 1 304 702 | 4/2003 |
| EP | 1 355 268 B1 | 4/2006 |
| JP | 5-244150 | 9/1993 |
| JP | 2001-14441 | 1/2001 |
| JP | 2001-188701 | 7/2001 |
| JP | 2001-325128 | 11/2001 |
| JP | 2002-229861 | 8/2002 |
| JP | 2002-351567 | 12/2002 |
| WO | 00/65602 | 1/2000 |
| WO | 00/51087 | 8/2000 |
| WO | 01/29670 | 4/2001 |

OTHER PUBLICATIONS

Rankl, Wolfgang et al., "Handbook of Chip-cards: Structure—Mode of Operation—Use of Smart Cards", 4$^{th}$ Ed., published Aug. 2002, pp. 22-23, ISBN: 3-446-22036-4 (original German document and English translation).

Rankl, Wolfgang et al., "Smart Card Handbook", 4$^{th}$ Edition, Aug. 2002, pp. 277-279 and 324-325 (original German document and English translation).

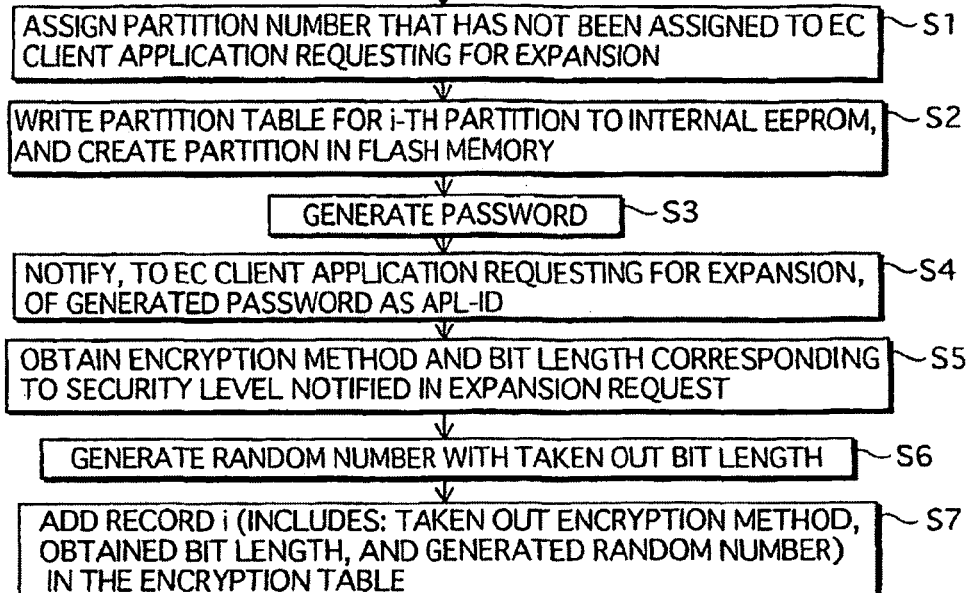
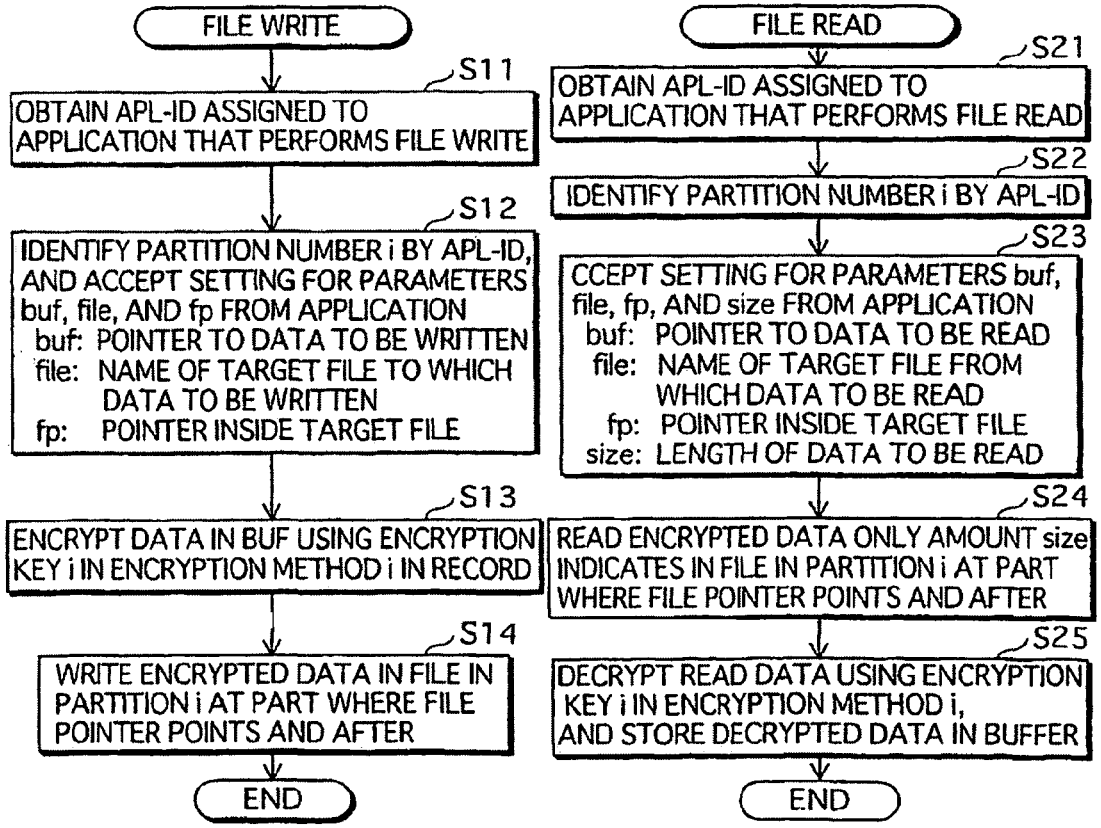

FIG.21

PERFORMANCE COMPARISON

| | COST | LARGE CAPACITY | WRITE UNIT | WRITE TIME | POSSIBLE NUMBER FOR REWRITE TIMES | WRITE STABILITY | READ TIME | READ TYPE | POWER CONSUMPTION |
|---|---|---|---|---|---|---|---|---|---|
| Flash | LOW | ○ | BLOCK ※1 | 10000ns | $10^6$ | UNSTABLE ※2 | 50ns | NON-DESTRUCTIVE | ○ |
| FeRAM | HIGH | △ | 1byte ※3 | 30~100ns | $10^{12}$~16 | STABLE | 30~100ns | DESTRUCTIVE ※4 | ◎ |

U.S. 7,895,405 B2

SEMICONDUCTOR MEMORY CARD, AND PROGRAM FOR CONTROLLING THE SAME

This application is a divisional of application Ser. No. 10/532,988, filed Apr. 28, 2005, now U.S. Pat. No. 7,526,625, which is the National Stage of International Application No. PCT/JP2004/000961, filed Jan. 30, 2004.

TECHNICAL FIELD

The present invention relates to a semiconductor memory card that ensures security of stored contents, and to a technology for expanding a storage capacity of the memory card.

BACKGROUND ART

Production of semiconductor memory cards is a rapidly growing industry of recent years that has drawn attention from entities in many areas, such as mass media, financial institutions, and governmental institutions both national and local.

It is a function for protecting contents stored in a memory card that has caught such heavy attention. Popular examples of semiconductor memory cards include an SD memory card and an IC card. The SD memory card is a contact type semiconductor memory card, having a nonvolatile memory, a logic circuit, and a connector. When a host device connects to the SD memory card via the connector, the SD memory card allows the host device to access the nonvolatile memory after authenticating the host device by performing a challenge-and-response mutual authentication. Because the SD memory card is able to reject an access from an unauthorized device and has a large capacity of nonvolatile memory from 64 MB to 1 GB, it is desirable to use the SD memory card for storing data that needs copyright protection, such as audio data and video data.

The IC card is such that a CPU, a mask ROM, and an IC chip containing EEPROM are disposed on a board, and a spiral antenna is buried in the board. The IC card performs noncontact data input/output with the host device via the spiral antenna. The IC chip is also called a tamper resistant module (TRM), and is resistant to reverse engineering such as disassembly and internal analysis.

Because of this tamper resistance, the IC card is desirable for payment use, and many credit card companies and banking companies consider adopting IC cards. Drawbacks of the IC card are that production cost is high and a capacity of the EEPROM in the TRM is only about 160 KB.

As described above, the SD memory card and the IC card each have pros and cons, and it is not easily concluded which is better.

A conventional art for the SD memory card is disclosed in a patent document 1 as follows.

<Patent Document 1>

Japanese Laid-Open Patent Application No. 2001-14441

In Electronic Commerce (EC) where the host device is a server of a credit card company, it is convenient to be able to download and store an annual transaction schedule in a semiconductor memory card. Data for the annual transaction schedule, however, is usually large in size, and the IC card does not have a sufficient memory capacity. On the other hand, it does not give a sense of security to store the annual transaction schedule in the SD memory card, which does not include a TRM, even though the SD memory card has a sufficient amount of memory capacity, because such an annual transaction schedule has values to be protected next to money.

Manufacturers of the semiconductor memory cards are facing a tough choice between mass production of TRMs risking the rise in production cost, and ignoring demands from the credit card companies.

SUMMARY OF THE INVENTION

An object of the present invention is to provide a semiconductor memory card that is capable of storing a large capacity of data that has a value next to money at a reasonable level of security.

In order to achieve the above object, a semiconductor memory card according to the present invention is a semiconductor memory card comprising a tamper resistant module and a nonvolatile memory, wherein the tamper resistant module includes: an internal memory having a usage area used by a program stored in the tamper resistant module; and a processing unit operable to (i) assign an area in the nonvolatile memory to the program, and (ii) generate, on the internal memory of the tamper resistant module, access information for the assigned area, the usage area and the assigned area thereby composing a total area for use by the program. Because the access information about the usage area of the program is generated in the tamper resistant module, it is possible to keep an entire structure of the usage area secret.

It becomes difficult to identify where one usage area starts and ends in the nonvolatile memory, and which area and how the program accesses is kept secret. Because it is difficult to grasp a location of the usage area as a whole, it is possible to prevent an illegal access.

The semiconductor memory card according to the present invention may also be the above semiconductor memory card wherein the processing unit comprises: an assigning unit operable to assign, at a time of the generation of the access information, an encryption key which the program uses in accessing the assigned area; an encrypting unit operable, at a time of the program writing data to the assigned area, to encrypt the data; and a decrypting unit operable, at a time of the program reading data from the assigned area, to decrypt the data.

The program is able to read from and write to the area only after the unique encryption key is assigned to the program. Accordingly, even if more than one program accesses the semiconductor memory card and one of the programs revealed the encryption key assigned to it, data that other programs have written to the semiconductor memory card may not be decoded by the encryption key assigned to the program. Even if an encryption key of one program is revealed, the rest of the EC client applications will not be affected, and therefore it is possible to maintain the secrecy of the data the programs write.

The semiconductor memory card according to the present invention may also be the above semiconductor memory card wherein the processing unit further comprises: a receiving unit operable to receive a security level from the program; and a storage unit that stores values for different security levels, bit lengths of an encryption key, and encryption methods, the bit lengths and encryption methods corresponding one-to-one to the values, the encryption key assigned by the assigning unit is generated based on a bit length corresponding to the received security level, and the encryption and decryption by the encrypting unit and decrypting unit, respectively, are performed based on an encryption method corresponding to the received security level. The program sets a security level based on importance of the data and necessary procedures for reading and writing the data, and requests the processing unit for data write and read based on the set security level. Therefore, it is possible to make arrangement that a security level of large and less important data is set low so the data write may be completed in a short period of time.

BRIEF DESCRIPTION OF THE DRAWINGS

FIG. 12A is a flowchart showing a process performed by an area expansion unit 11 and an encryption/decryption unit 14.

FIG. 12B is a flowchart showing a process of file write performed by the area expansion unit 11 and the encryption/decryption unit 14.

FIG. 12C is a flowchart showing a process of file read performed by the area expansion unit 11 and the encryption/decryption unit 14.

FIG. 21 is a table of performance comparison between the flash memory and a FeRAM.

DETAILED DESCRIPTION OF THE INVENTION

First Embodiment

A semiconductor memory card of a first embodiment according to the present invention is explained below. The semiconductor memory card of this embodiment is an SDeX memory card. The SDeX memory card is used as a medium for an SD portable device like SD memory cards, and, at the same time, has a tamper resistant module (TRM) built-in like IC cards. Further, the SDeX memory card is capable of performing both contact communication and noncontact communication in order to communicate with external devices.

Figure 1:
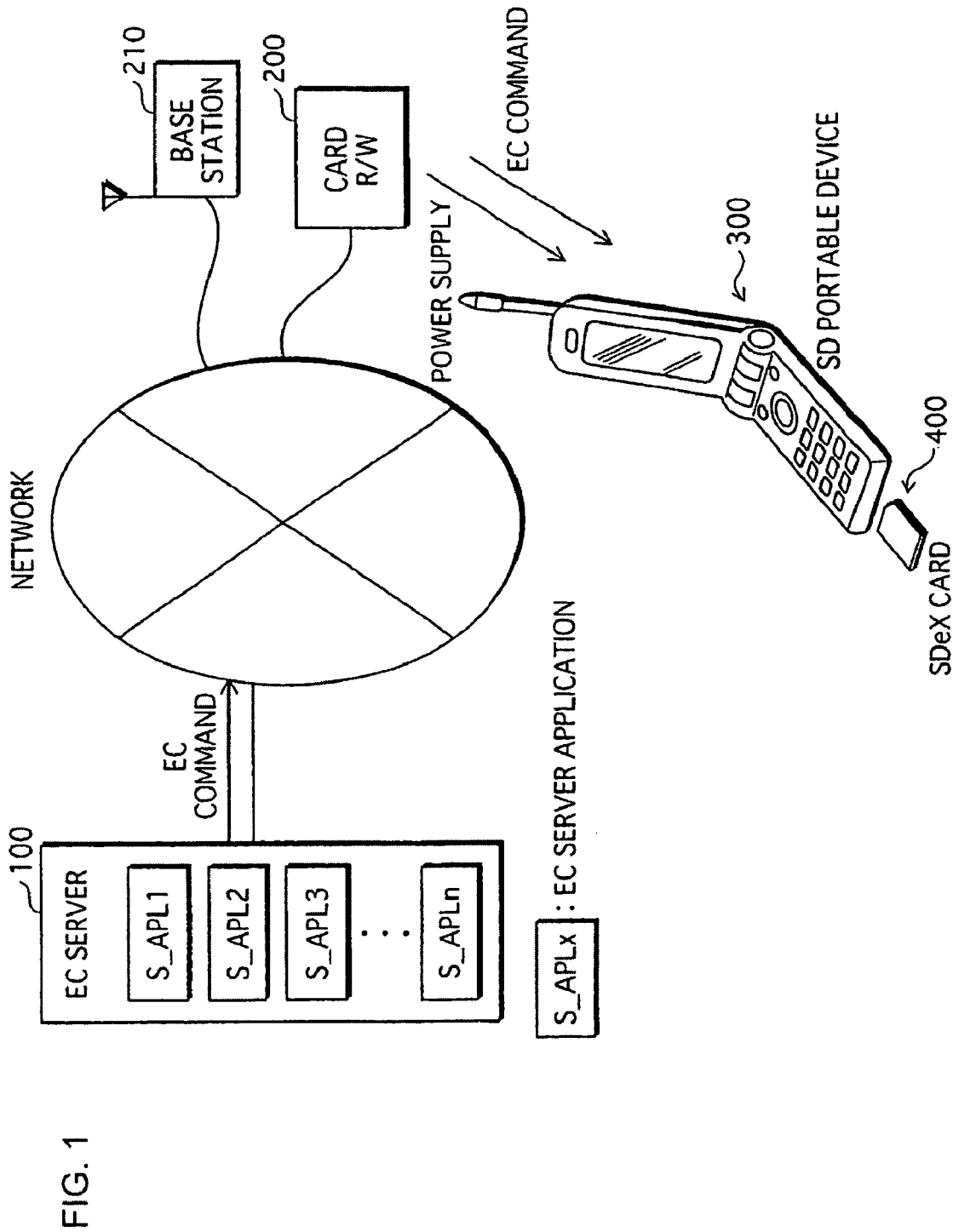
FIG. 1 illustrates an environment in which an SDeX memory card is used.

First of all, an explanation for a practical use of the semiconductor memory card of this embodiment (SDeX memory card) is given. The SDeX memory card is connected to the SD portable device, such as a cell phone, and used by a user in such an environment shown in FIG. 1. FIG. 1 illustrates the environment in which an SDeX memory card 400 is used.

An EC server 100, a card reader/writer 200, a base station 210, and a SD portable device 300 are included in the environment in FIG. 1.

The EC server 100 provides the IC card with an EC service via the card reader/writer 200, a base station 210, and a network. A plurality of EC applications work in the EC server 100, and each of the EC applications provides a specific EC service to the SDeX memory card 400. The EC applications working on the EC server 100 are EC server applications for a different kind of EC service. In FIG. 1, n kinds of EC server applications for n kinds of services are referred to as S_APL 1, 2, 3, . . . , n, respectively. Providing the EC services by the EC server 100 is performed by issuing an EC command to the SDeX memory card 400 via the network, the card reader/writer 200, and the base station 210.

The card reader/writer 200 is such as a cash dispenser at financial facilities or a device equipped to cash registers, and supplies power to the SDeX memory card 400 and performs noncontact data input/output with the SDeX memory card 400. The card reader/writer 200 is connected to the network and the SDeX memory card 400 is able to receive the EC service provided by the EC server 100 via the card reader/writer 200.

The base station 210 is a device equipped at a rooftop of building structures and at a top of electric poles, and performs wireless data input/output with the cellular telephone type SD portable device 300. The base station 210 is connected to the network, and the SD portable device 300 is able to receive the EC service provided by the EC server 100 via the base station 210.

The SD portable device 300 is a device to which the SDeX memory card 400 is connected in order to access the SDeX memory card 400. A browser and the like is installed in the SD portable device 300, and a user is able to access a file system (FS) in the SDeX memory card 400 via a user interface of the browser. The access to the file system becomes possible by issuing an SD command that is specified in the SD memory card to the SDeX memory card 400, and receiving a response to the SD command from the SDeX memory card 400. When the SD portable device 300 is booted from the SDeX memory card 400 with the bootstrap, the SD portable device 300 and the SDeX memory card 400 function as an IC card as a whole. A spiral antenna is buried in aback of the SD portable device 300, and when the SD portable device 300 functions as the IC card, the spiral antenna supplies the SDeX memory card 400 with power from the card reader/writer 200. The SD portable device 300 also performs a two-way conversion between command/response with the SDeX memory card 400 and command/response with the EC server 100. Specifically, the two-way conversion performed by the SD portable device 300 is such that the SD portable device 300 generates an expanded SD command by encapsulating an EC command received from the EC server 100, then outputs the expanded SD command to the SDeX memory card 400, and retrieves an EC response from an SD response from the SDeX memory card 400, then outputs the retrieved EC response to the EC server 100. A mode in which the SD portable device 300 is booted from the SDeX memory card 400 with the bootstrap and functions as the IC card is called an "EC mode". The other mode in which the SD portable device 300 uses the SDeX memory card 400 as a recording medium is called an "SD mode".

When the SDeX memory card 400 used is in the SD mode, the SDeX memory card 400 is used as an SD card. In this case, the host device of the SDeX memory card 400 is the SD portable device 300. The SDeX memory card 400 stores audio data and video data which the SD portable device 300 downloads from a distribution server. The host device is able to reproduce the audio data and video data stored in the SDeX memory card 400.

When the SDeX memory card 400 used is in the EC mode, the SDeX memory card 400 is used as an IC card. The SDeX memory card 400 is connected to the SD portable device 300 in this case too. The host device of the SDeX memory card 400, however, is not the SD portable device 300, but the EC server 100 on the network. The SDeX memory card 400 communicates with the EC server 100, utilizing the SD portable device 300 connected to the SDeX memory card 400, along with the card reader/writer 200 and the base station 210. With this communication, the SDeX memory card 400 is able to perform a money transaction with the EC server 100.

The SDeX memory card 400 of the present embodiment has increased convenience for users because it can be used as an IC card in addition to a storage for distributed audio data and video data.

In FIG. 1, the memory card 400 in the EC mode accesses the EC server 100 via the card reader/writer 200, it is also possible that the portable device 300 accesses the EC server 100 via the base station 210.

Next, manufacturing of the semiconductor memory card according to the present invention is described below. The semiconductor memory card according to the present invention may be industrially produced based on an internal structure illustrated in FIGS. 2 and 3.

Figure 2:
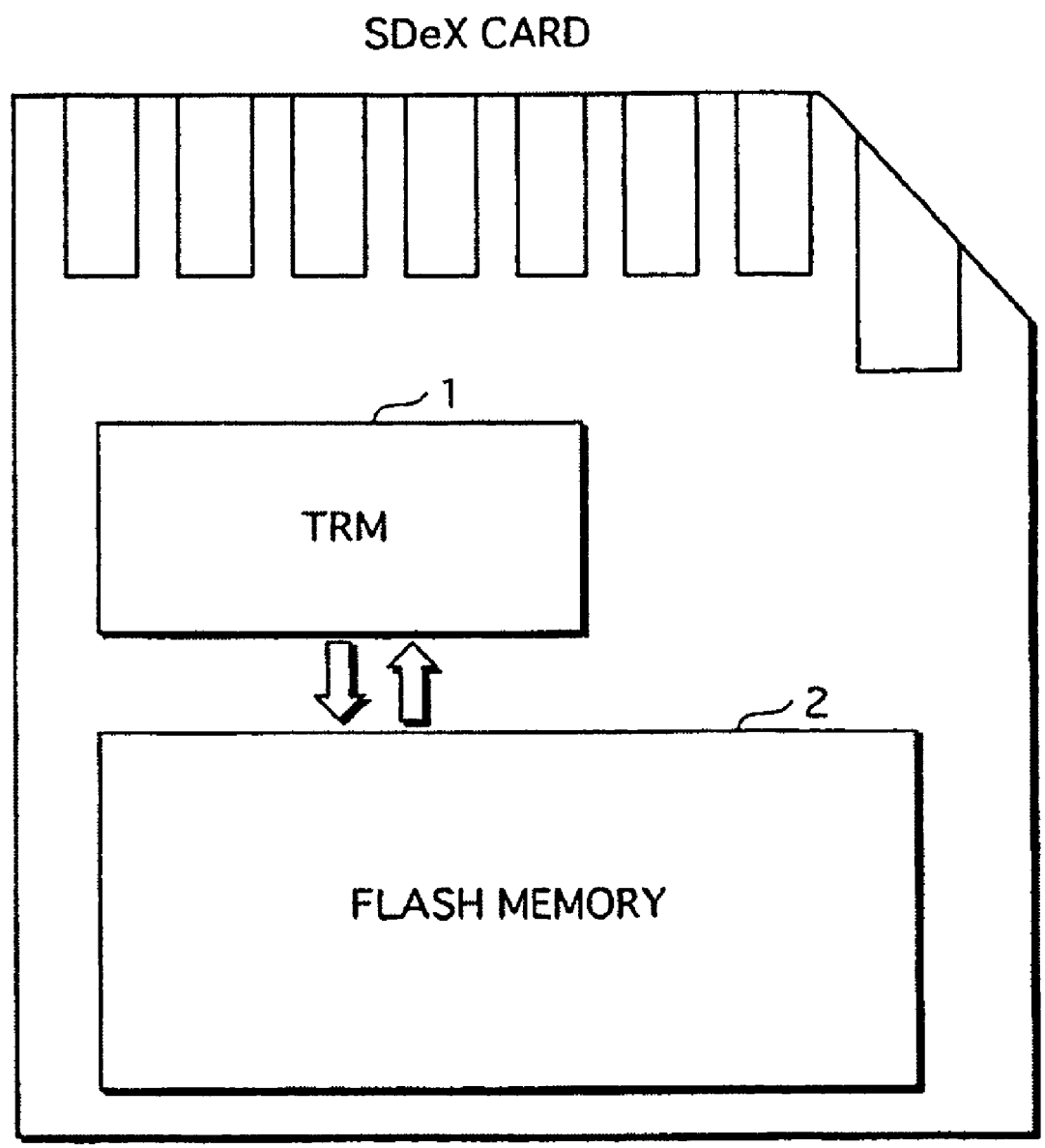
FIG. 2 illustrates an internal structure of a semiconductor memory card according to the present invention.

As shown in FIG. 2, a connector, a tamper resistant module (TRM) 1, a flash memory 2 having 256 MB storage capacity are mounted in the semiconductor memory card according to the present invention.

The tamper resistance in general means the following.
(1) The internal structure may not be analyzed even if the chip is physically unpacked.
(2) The internal structure may not be analyzed even if the chip is irradiated with electromagnetic waves.
(3) A relation between a data length of input data and a processing time is non-linear.
(4) Output data may not be calculated back using a processing result when an error has occurred due to input data.

Because of the above characteristics described in (1)-(4), the TRM 1 is resistant to many kinds of reverse engineering. The following describes hardware elements in the TRM 1.

Figure 3:
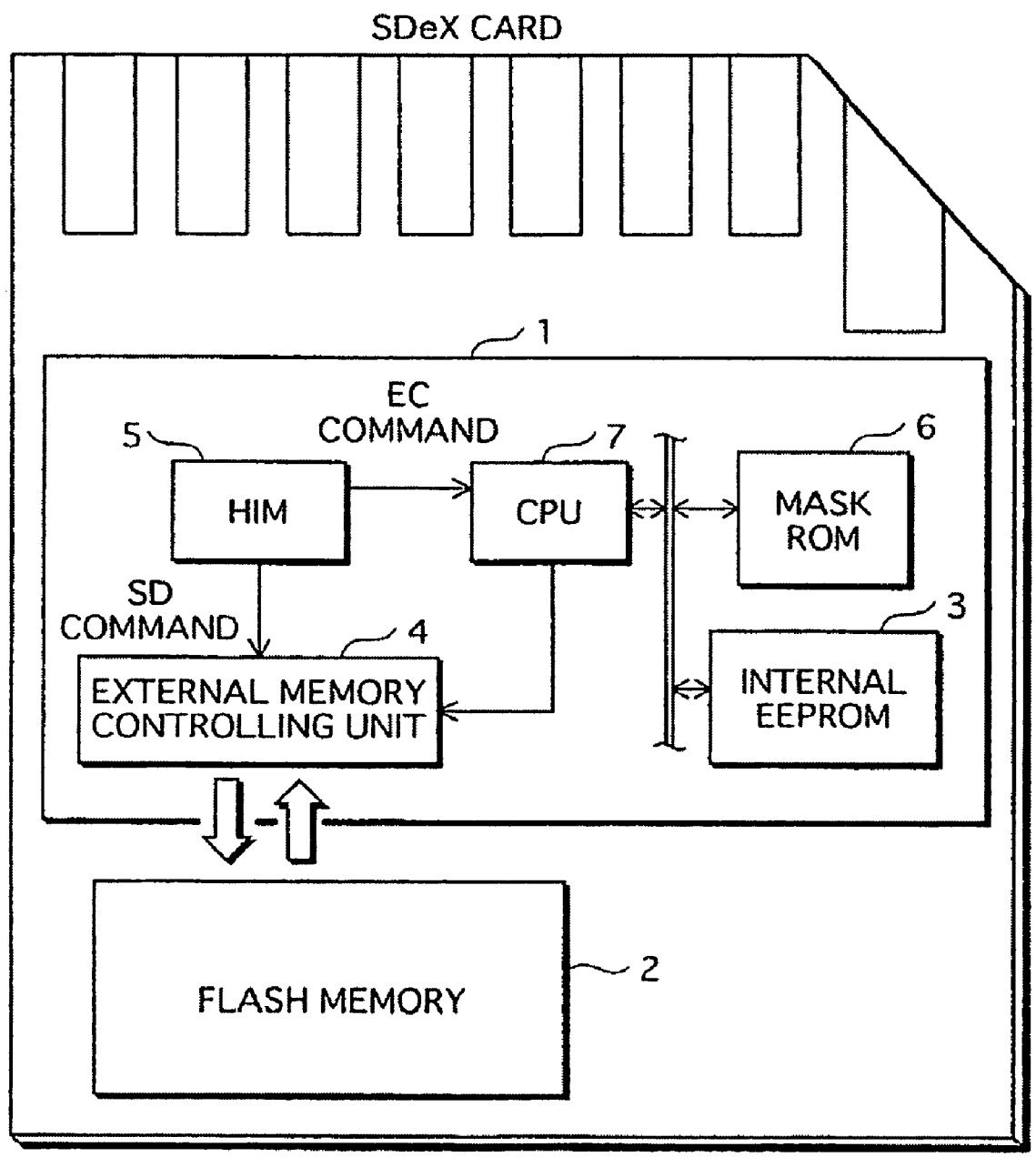
FIG. 3 illustrates a hardware structure in a TRM 1.

FIG. 3 illustrates a hardware structure in the TRM 1. As shown in FIG. 3, an internal EEPROM 3, an external memory controlling unit 4, a host interface module (HIM) 5, a mask ROM 6, and a CPU 7 are mounted inside the TRM 1, forming a microcomputer system.

The internal EEPROM 3 is a readable and writable memory. The microcomputer system mounted as the TRM 1 is expensive in production cost per unit area. A capacity of the internal EEPROM 3 is 32 KB. For convenience, the internal EEPROM is referred to as an internal memory, and the flash memory 2 illustrated in FIG. 2 is referred to as an external memory, in some cases in the present specification.

The external memory controlling unit 4 is a dedicated circuit for accessing the flash memory 2. The access to the flash memory 2 is performed based on SD commands issued by the SD portable device 300.

The HIM 5 refers to command numbers for the SD commands issued by the SD portable device 300, and sorts the SD commands based on the command numbers. The SD command numbers include numbers from one to m, as well as extension numbers that are greater than m. When a command number for an SD command is one to m, the SD command is outputted to the external memory controlling unit 4, and when the command number is greater than m, the SD command is outputted to the CPU 6 after obtaining an encapsulated EC command from the SD command.

The mask ROM 6 is a read only memory in which an operation system (OS), a Java virtual machine, and an application are stored in advance. The SD portable device 300 runs in the EC mode by being booted with the bootstrap from a fixed address in the mask ROM 6.

The CPU 7 executes programs stored in the mask ROM 6.

Figure 4:
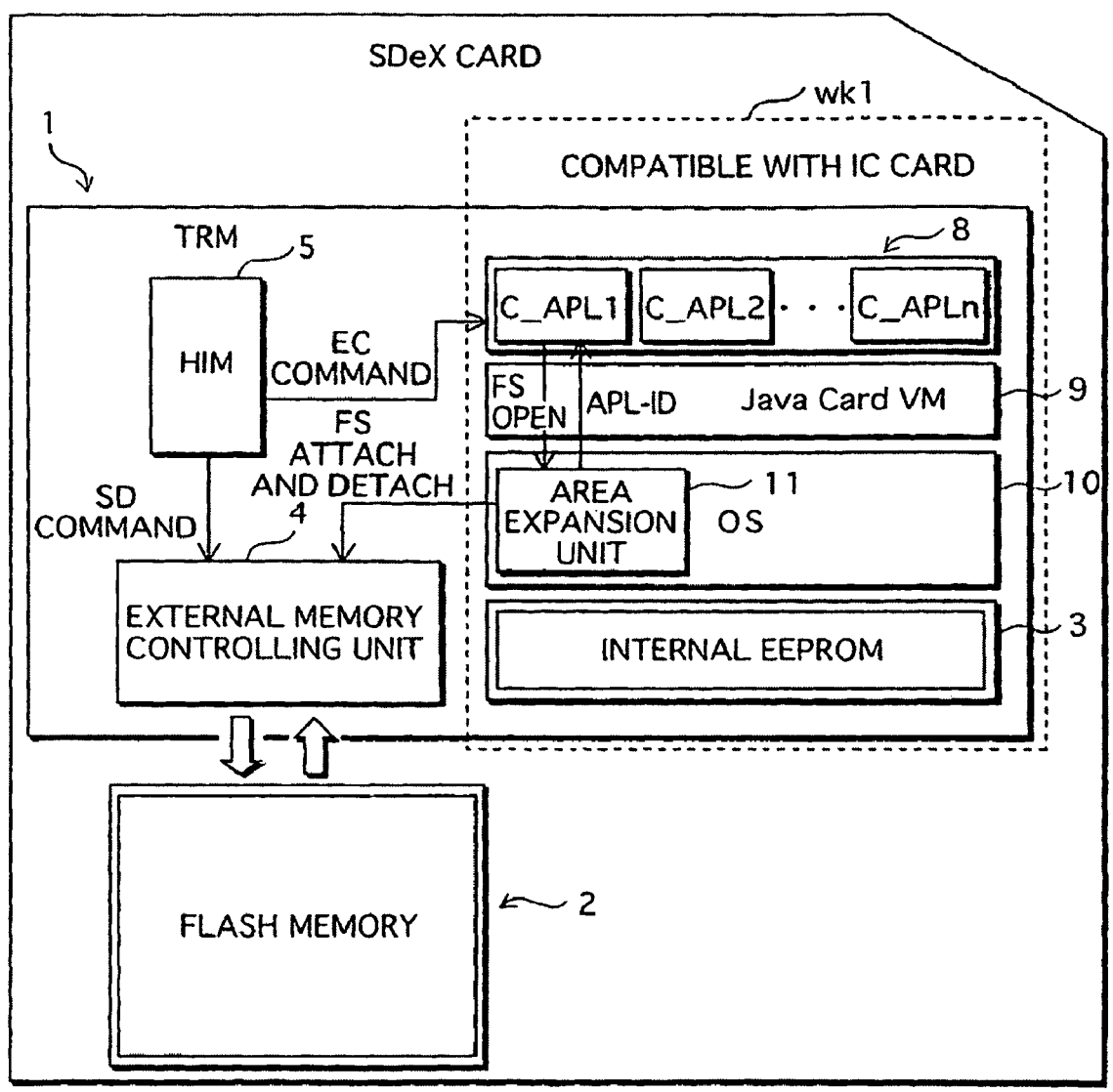
FIG. 4 illustrates a software structure for a part corresponds to a mask ROM 6 and a CPU 7 in the TRM 1 of FIG. 3.

FIG. 4 illustrates a software structure for a part corresponding to the mask ROM 6 and the CPU 7 in the TRM 1 of FIG. 3. A part shown as wk 1 in a broken line is a module compatible with the IC card (IC-card-compatible module). A part that is inside the TRM 1 and outside the broken line is a module compatible with the SD memory card.

The part compatible with the SD memory card includes the external memory controlling unit 4 and the HIM 5. The HIM 5 has conventional functions in the SD memory card, and functions as an interface to the IC-card-compatible module.

The IC-card-compatible module has a layered structure. In this layered structure, the internal EEPROM 3 is in a lowest layer (physical layer), an OS 10 is in a layer one above the internal EEPROM 3, and the Java virtual machine 9 is in a layer one above the OS 10. EC client applications 8 are in a top layer. Note that the external memory controlling unit 4 is in the physical layer as with the internal EEPROM 3.

An explanation about the software structure (the EC client applications 8, the Java virtual machine 9, and the OS 10) illustrated in FIG. 4 is given below.

The EC client applications 8 are a kind of EC application described in the Java language, and access the EC server 100 based on a user operation. The EC server 100 has more than one EC server application, each for a different kind of EC service, and the SDeX memory card 400 also has more than one EC client application, each for a different kind of EC service. "C_APL1, 2, 3, ... n" in the drawing indicates that the SDeX memory card 400 has the EC client applications that correspond to the EC server application S_APL1, 2, 3, ... n, respectively. By the EC client applications 8 sending and receiving commands between the EC server applications on the EC server 100 via the card reader/writer 200 and the base station 210, a user may accept various EC services on the EC server 100. When the EC command received from an EC server application on the EC server is a write data command, a corresponding EC client application outputs the received EC command to the OS 10 via the Java virtual machine 9.

The EC client applications 8, other than an intended role as the EC client application, access the flash memory 2 and the internal EEPROM 3 based on the user operation when in the EC mode. The access to the flash memory 2 and the internal EEPROM 3 by the EC client applications 8 includes a file access such as creating files and read/write in the files.

The Java virtual machine 9 (JavaCard VM™ in the drawing) converts the EC client applications 8 described in the Java language into a native code of the CPU 7, and has the CPU 7 execute the converted applications.

The OS 10 reads and writes the flash memory 2 and the internal EEPROM 3 based on the commands issued by the EC client applications. This is the end of the explanation of the software structure of the SDeX memory card 400.

Figure 5:
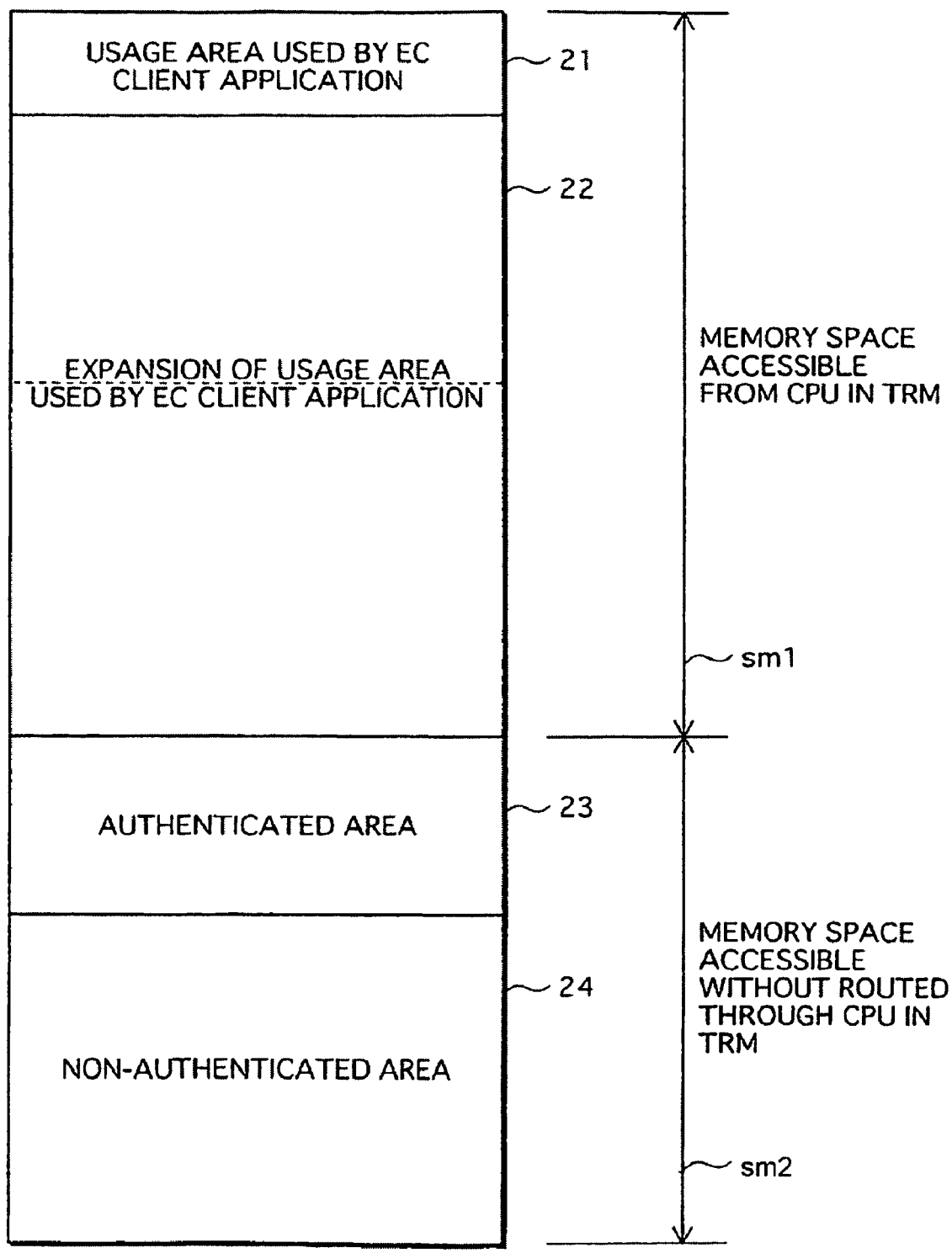
FIG. 5 illustrates a logical format of an external flash memory 2 and an internal EEPROM 3.

Next, a logical format of the flash memory 2 and the internal EEPROM 3 is explained below. FIG. 5 illustrates the logical format of the external flash memory 2 and the internal EEPROM 3. The SDeX card of the present invention is a multi-application semiconductor memory card, which is capable of handling multiple applications C_APL1, 2, 3, ..., n. Accordingly, the logical format of the SDeX card of the present invention includes multiple file systems corresponding to the applications C_APL1, 2, 3, ..., n, respectively.

Generally, a file system of a storage medium is an area in the storage medium and data stored in the file system is recognizable as a file or a directory. Specifically, programs accessing the storage medium may write and read data to and from the file or the directory without concern about a physical unit in the storage medium such as a sector and a recording block. An information system for realizing the file and the directory on the storage medium is called a file system structure. The logical format described above includes such file systems for each of the EC client applications.

A space that is a total area of the flash memory 2 and the internal EEPROM 3 is divided into two memory spaces sm 1 and sm 2. The memory space sm 1 is accessible from the CPU 7 in the TRM 1, and includes a usage area 21 used by EC client applications and an expanded area 22 that is also used by the EC client applications. The memory space sm 2 is accessible by the SD portable device 300 without routed through the CPU 7 in the TRM 1, and includes an authenticated area 23 and a non-authenticated area 24. The authenticated area 23 and the non-authenticated area 24 are memory areas in the SD memory card, used by applications (SD applications) in the SD portable device. Referring to the above stated patent document (Japanese Laid-Open Patent Application No. 2001-14441) would be helpful for general meanings of the authenticated area 23 and the non-authenticated area 24.

Figure 6:
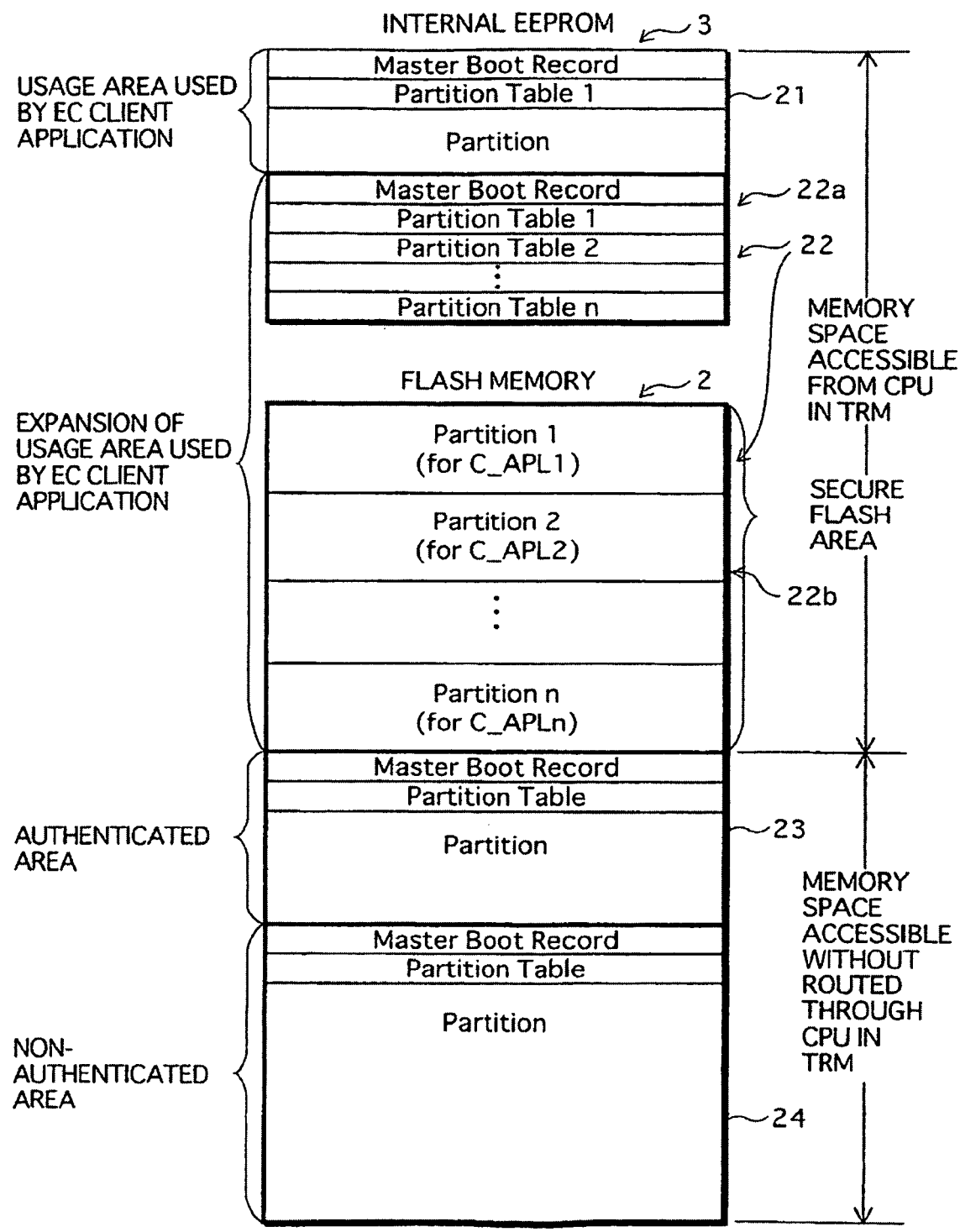
FIG. 6 illustrates an internal structure of an expanded area 22, an authenticated area 23, and a non-authenticated area 24.

FIG. 6 illustrates an internal structure of the expanded area 22, the authenticated area 23, and the non-authenticated area 24. The expanded area 22, the authenticated area 23, and the non-authenticated area 24 have a file system structure compliant with ISO/IEC 9293. ISO/IEC 9293 is an example of possible file system structures chosen for convenience, and a different file system structure such as Universal Disk Format (UDF) may also be used. The authenticated area 23 and the non-authenticated area 24 are outside the TRM 1, and accordingly a secure level of the authenticated area 23 and the non-authenticated area 24 is the lowest. Provided that there are three levels ("high", "medium", and "low"), the secure level of the authenticated area 23 and the non-authenticated area 24 is "low".

The usage area 21 used by the EC client applications is an area in which more than one file system is provided. Each file system corresponds to each application of the multiple applications. In FIG. 6, "Master Boot Record", "Partition Table", and "Partition" are shown only one for each. However, each of the multiple applications has corresponding "Partition Table" and "Partition", respectively, in the usage area 21 used by the EC client applications. An entire part of the usage area 21 is contained in the TRM 1, and accordingly, the secure level of the usage area 21 is the highest. Provided that there are three levels ("high", "medium", and "low"), the secure level of the usage area 21 is "high".

The expanded area 22 is an expansion of the usage area 21 used by the EC client applications, and includes a sub-area 22a in the internal EEPROM 3 and a secure flash area 22b in the flash memory 2. The secure flash area 22b contains partitions 1, 2, 3, ..., n. The partitions 1, 2, 3, ..., n are file system areas each corresponding to each application of the multi applications in the TRM. In order to recognize the partitions 1, 2, 3, ..., n as the file system areas, information to access the file system areas (access information) becomes necessary. In the present embodiment, the access information corresponds to partition tables 1, 2, 3, ..., n. The partition tables 1, 2, 3, ..., n included in the sub-area 22a is a characteristic part of the present embodiment.

The SD portable device 300 only recognizes the authenticated area 23 and the non-authenticated area 24 in the SD mode. It is not possible to access the usage area 21 and the secure flash area 22b in the SD mode, because a master boot record and the partition tables are in the TRM 1.

An access to the secure flash area 22b is possible only from the CPU 7. This means that the access to the secure flash area 22b is basically restricted to accesses by the EC client applications. The secure level of the secure flash area 22b is medium, because the access information is stored in the TRM 1. Provided that there are three levels ("high", "medium", and "low"), the secure level of the usage area 21 is "medium". Note that an application that runs in the SD mode may access the secure flash area 22b on an exceptional basis by issuing a special command.

In FIG. 6, a file system area (partition) and access information (partition table) in the usage area 21 are different from the access information in the secure flash area 22b. The usage area 21 is an area separate from the secure flash area 22b. Accordingly, even in a worst case in which contents of the file system areas in the flash memory 2 are revealed by a person with a malicious intent, it is almost improbable that the usage area 21 is revealed through the content of the secure flash area 22b. By keeping the two access information separately, it is possible to realize a firewall function for the usage area 21, and maintain secrecy of the usage area 21.

Figure 7:
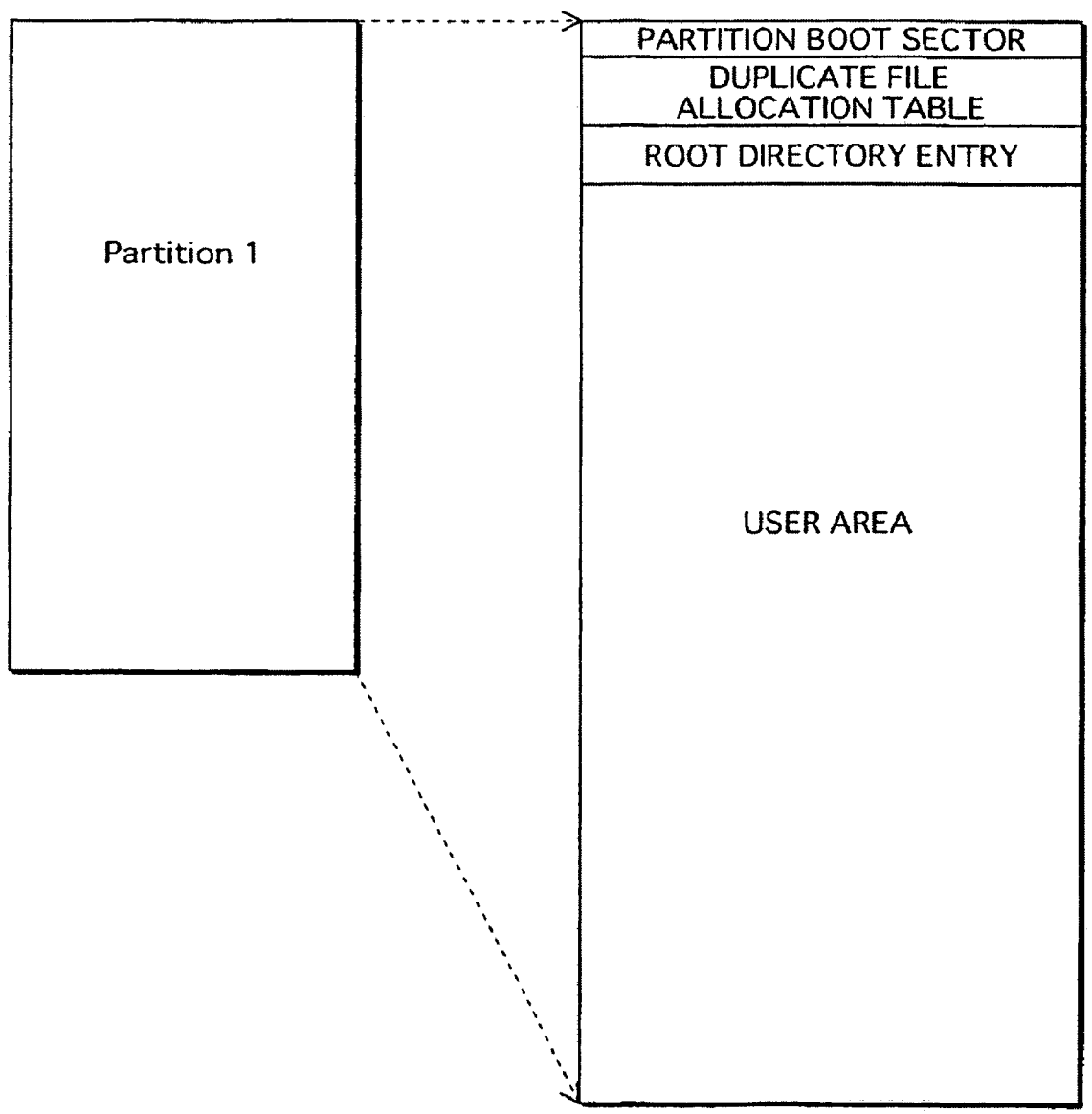
FIG. 7 illustrates a structure common to all partitions.

An internal structure of the partitions in the secure flash area 22b, the authenticated area 23, and the non-authenticated area 24 are the same. FIG. 7 illustrates the structure common to the partitions.

A partition includes a "Partition Boot Sector", a "Duplicate File Allocation Table", a "Root Directory Entry", and a "User Area".

The "Partition Boot Sector" is a table in which information for partitions are described.

The "Duplicate File Allocation Table (FAT)" is made of two FATs compliant with ISO/IEC 9293. Each FAT includes FAT entries which each correspond to a different cluster. Each FAT entry indicates whether or not the corresponding cluster is being used. If the corresponding cluster is not used, the file entry is set "0", and if the corresponding cluster is used, a cluster number is set for the file entry. The cluster number indicates a linkage among clusters, such as which cluster to be read next after reading the cluster that corresponds to the file entry of the cluster number.

The "Root Directory Entry" includes file entries for files in a root directory. Each file entry includes information of a corresponding file: a file name, a file extension, a file head cluster number (the number of a cluster in which a head part of the file is stored), a file attribute, a file recording time, a file recording data, and a file length.

The "User Area" is an area in which files are stored. A set of sectors and recording blocks that belong to the user area, which is recognized as a file, is a substantial part of the file. This is the end of the explanation of the partitions. The partition tables and the partition boot sector are explained next.

Figure 8A:
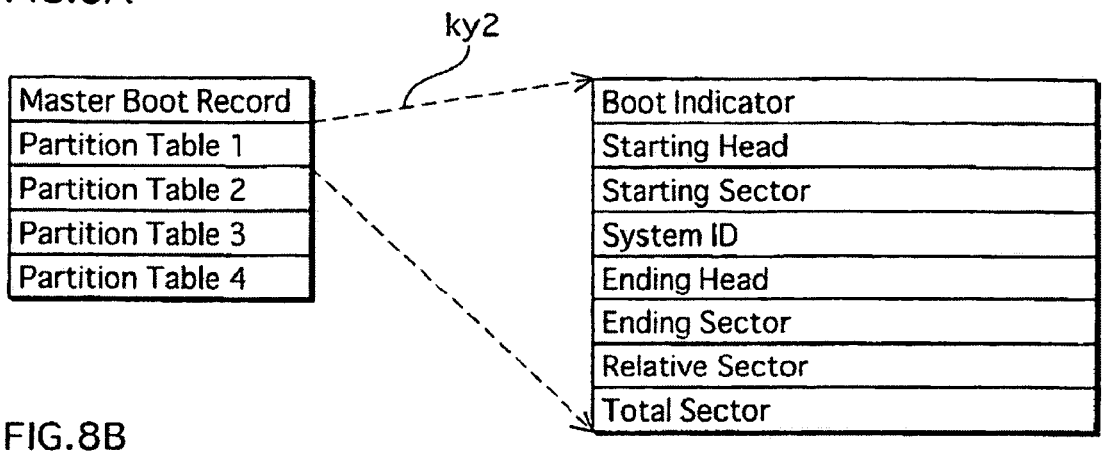
FIG. 8A illustrates a partition table.

The partition tables for the secure flash area 22b are in the internal EEPROM 3. On the other hand, the partition tables for the authenticated area 23 and the non-authenticated area 24 are in the flash memory 2. However, the partition tables for the secure flash area 22b, the authenticated area 23, and the non-authenticated area 24 all have the same internal structure illustrated in FIG. 8A. FIG. 8A illustrates a partition table, and FIG. 8B illustrates a partition boot sector of the partition in FIG. 7.

The "Partition Table" is a table indicating a location and a size of a corresponding partition, and, as shown by an arrow ky 2 in FIG. 8A, includes a "Boot Indicator", a "Starting Head" for specifying the starting header of the partition, a "Starting Sector" for specifying the starting sector of the partition, a "System ID" indicating a type of the file system area, an "Ending Head", an "Ending Sector" for specifying the ending sector of the partition, a "Relative Sector" indicating a number of relative sectors till the starting sector in the partition, and a "Total Sector" indicating a number of the sectors in the partition.

Figure 8B:
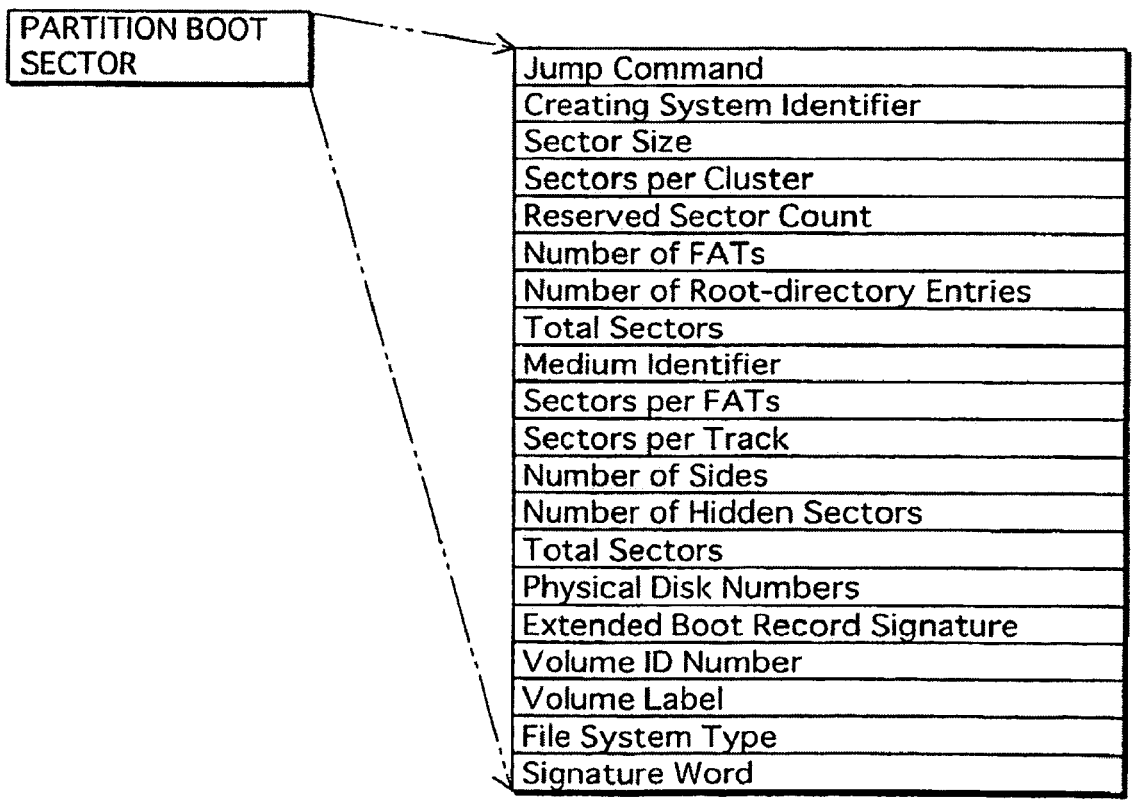
FIG. 8B illustrates a partition boot sector in an partition illustrated in FIG. 7.

In the partition boot sector, an Extend FDC descriptor having information items illustrated in FIG. 8B is set. According to FIG. 8B, the Extend FDC descriptor includes such items as Jump Command, Creating System Identifier, Sector Size indicating a size of one sector, Sector per Cluster indicating a number of sectors per cluster, Reserved Sector Count, Number of FATs indicating a number of FATs includes in a duplicate FAT, Number of Root-directory Entries, Total Sectors, Medium Identifier, Sector Per FAT indicating a number of sectors per FAT, Sector Per Track, Number of Sides, Number of Hidden Sectors, Total Sectors indicating a total number of sectors, Physical Disk Number, Extended Boot Record Signature, Volume ID Number, Volume Label, File System Type, and Signature Word.

This is the end of the explanation of the internal structure of the TRM 1. Next, an area expansion unit 11 and technical significance of mounting the area expansion unit 11 are explained below.

In the IC-card-compatible module, data received from the EC server application is written to the internal EEPROM 3. The data that the EC server application requests to write relates to money, and most of such data is small enough in size to be stored in the internal EEPROM 3. However, in a case in which the data that the EC server application requests to write relates to the annual transaction schedule, the internal EEPROM 3 does not have a sufficient memory capacity, because the annual transaction schedule is too large in size. On the other hand, it does not give a sense of security to store the annual transaction schedule in the flash memory 2, because such an annual transaction schedule has values to be protected next to money.

Therefore, the area expansion unit 11 expands the usage area from the internal EEPROM 3 to the flash memory 2, with maintaining the security next to TRM 1.

The area expansion unit 11 assigns one file system area in the flash memory 2 to the EC client application, upon request from an EC client application for the expansion of the usage area. The file system area assigned to the EC client application is uniquely assigned to the EC client application, and other EC client applications are not allowed to access the file system area. In the file system area as a closed space, the EC client application may freely access the files. The file system area assigned by the area expansion unit 11 is a partition within the secure flash area 22b described above. An attaching by the area expansion unit 11 is performed upon request from the EC client application for opening the file system. When the opening of the file system is requested, the area expansion unit 11 generates a partition in the flash memory 2, and allocates a partition table for the generated partition. Then, the area expansion unit 11 gives the EC client application an APL-ID for using the file system area. The APL-ID is a random number having 10 digits or more, and used like a password.

The EC client application is able to read and write data from and to the assigned file system area, by using the APL-ID given by the area expansion unit 11. Opening the file system area is not the same as opening a file, and in order to open a file in the secure flash area 22b, the EC client application is required to perform opening two times; open the file system first, and then open an actual file.

After the EC client application finishes reading and writing the data, a detaching of the file system is performed. The detaching of the file system is to release the partition assigned to the EC client application. The detaching by the area expansion unit 11 is performed upon request from the EC client application for closing the file system. When the closing of the file system is requested, the area expansion unit 11 performs the detaching. Closing the file system area is not the same as closing a file, and the EC client application is required to perform closing two times; close the file first, and then close the file system. When the same EC client application is going to use the same partition later on, the EC client application has to prove the authenticity using the APL-ID before the area expansion unit 11 performs the attaching.

Figure 9:
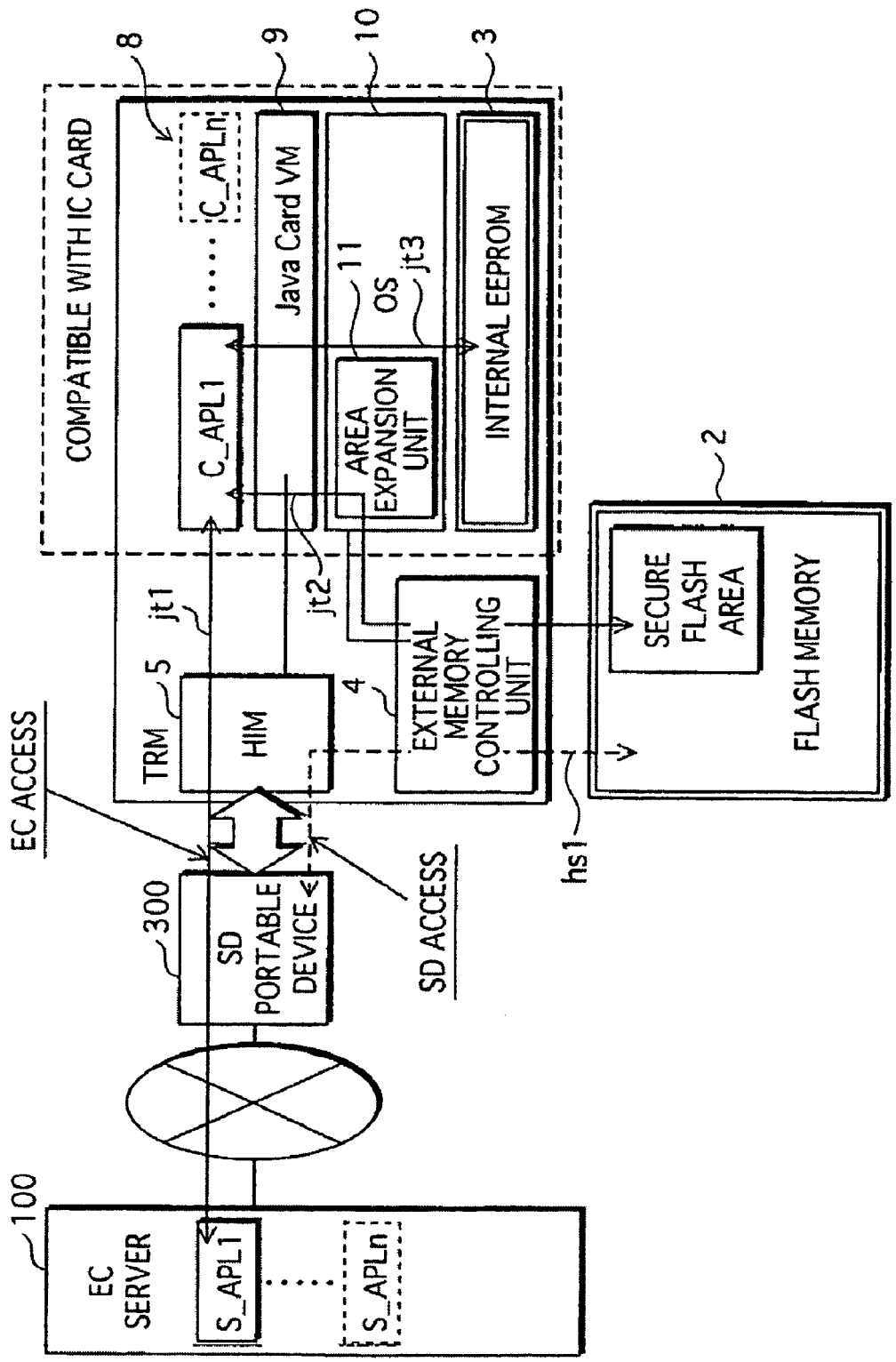
FIG. 9 illustrates accesses to the SDeX memory card from an EC server 100 and from an SD portable device 300.

FIG. 9 illustrates accesses to the SDeX memory card 400 from the EC server 100 and the SD portable device 300. Arrows jt1, jt2, and jt3 in solid line schematically show accesses to the SDeX memory card 400 from the EC server 100, and an arrow hs1 in broken line schematically shows an access to the SDeX memory card 400 from the SD portable device 300. As shown in this drawing, the EC server 100 in an EC access is able to access any of the internal EEPROM 3 and the secure flash area 22b in the flash memory 2, and the EC server application in the EC server 100 may select which to write, based on a level of importance and a size of data to be written.

Figure 10:
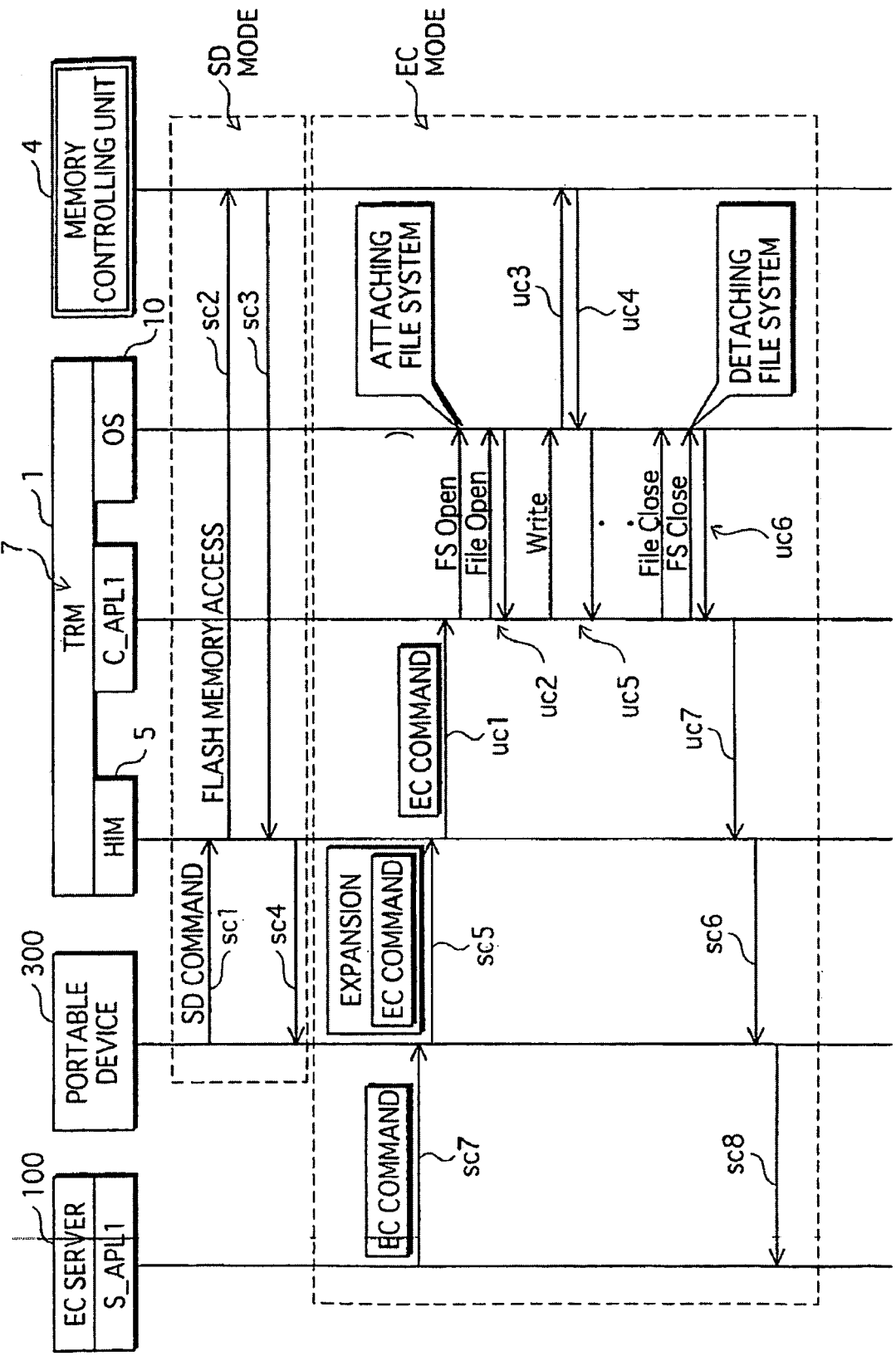
FIG. 10 illustrates command-response sequences among the SDeX memory card, the SD portable device 300, and the EC server 100.

FIG. 10 illustrates command-response sequences among the SDeX memory card, the SD portable device 300, and the EC server 100. Arrows facing right in the drawing indicate commands, and arrows facing left indicate responses.

In the SD mode, the SD portable device 300 is the host device, and the SD portable device 300 performs sending/receiving sc1, sc2, sc3, and sc4 of SD commands and SD responses between the external memory controlling unit 4 in the SDeX memory card 400 via the HIM 5.

The sequence in the EC mode uses basically the same sequence as in the SD mode, and a sending/receiving sc5 and sc6 of a command and a response are performed between the SD portable device 300 and the external memory controlling unit 4 via the HIM 5. The command and response here are an SD command and an SD response generated by encapsulating an EC command and an EC response, respectively. The SD portable device 300 performs, in addition to sending/receiving of the command and response via the HIM 5, sending/receiving sc7 and sc8 of an EC command and an EC response with the EC server 100 via the card reader/writer 200, the base station 210, and the network. Performing the sending/receiving of the EC command and EC response is a first difference from the sequence in the SD mode. In sending and receiving of commands and responses with the EC server 100, the SD portable device 300 performs mutual conversion between an EC command/response and an SD command/response.

A second difference from the sequence in the SD mode is described below. While the command/response are transmitted between the external memory controlling unit 4 and the HIM 5 directly in the SD mode, the command/response in the EC mode are transmitted via the EC client application 8 and the area expansion unit 11 in the IC-card-compatible module. The sequence in the EC mode includes indirections uc1, uc2, uc3, uc4, uc5, uc6, and uc7, and this is the second difference between sequences in the SD mode and in the EC mode.

In the indirections uc1-uc7, the EC client application performs a file system open and a file open, in an order, prior to writing to the flash memory 2. When the file system open is instructed, the area expansion unit 11 performs attaching the file system.

On the other hand, after writing in the flash memory 2, the EC client application performs a file close and a file system close. When the file close is instructed, the area expansion unit 11 performs detaching the file system.

As described above, according to the present embodiment, in expanding the usage area from the internal EEPROM in the TRM 1 to the flash memory 2, a partition that is a part of the expanded area is assigned on the flash memory 2 to the EC client application, and the partition table is generated in the TRM 1. Because the partition table that is an essential part of the expanded area is kept secret in the TRM, a person with a malicious intention is not able to know where the expanded area starts. By this, it is possible to maintain the secrecy of data written by the EC client application.

Moreover, each EC client application is assigned with a partition, and a relation among partitions is made exclusive. Accordingly, even if one of a plurality of EC client applications is operated by the person with the malicious intention, contents stored in partitions assigned to other EC client applications will not be disclosed to the EC client application operated by the person. Because an unauthorized access to one EC client application may not be spread to the rest of the EC client applications, it is possible to maintain the secrecy of the stored contents.

Second Embodiment

A second embodiment relates to an improvement so as to protect the stored contents in the secure flash area 22b more tightly than the first embodiment. Protection of the stored content in the SDeX memory card 400 is generally realized by encrypting the stored contents.

However, in a case in which the secure flash area 22b is accessed by an illegal EC client application, there is a possibility that an encryption key that encrypts the stored contents in the secure flash area 22b might be revealed by the person operating the illegal EC client application. In such a case, there is another possibility that the stored contents of other EC client applications that access the secure flash area 22b are also revealed, and damages could spread to EC providers of other EC client applications that access the secure flash area 22b.

In the present embodiment, in order to prevent the stored contents in the secure flash area 22b from being entirely revealed, the OS 10 assigns an encryption key unique to the EC client application, when the partition is assigned to each EC client application. At a time of the EC client application accessing to a file system in the assigned secure flash area, the EC client application encrypts and decrypts data to be written to and read from the file system using the unique encryption key assigned to the EC client application. Partitions are assigned to the EC client application in one to one correspondence, and the encryption and decryption are performed using the unique encryption key assigned to each of the EC client applications. Accordingly, even if a user who is operating one EC client application finds out the encryption key assigned to the EC client application, it is not possible to find out encryption keys assigned to other EC client applications.

Figure 11:
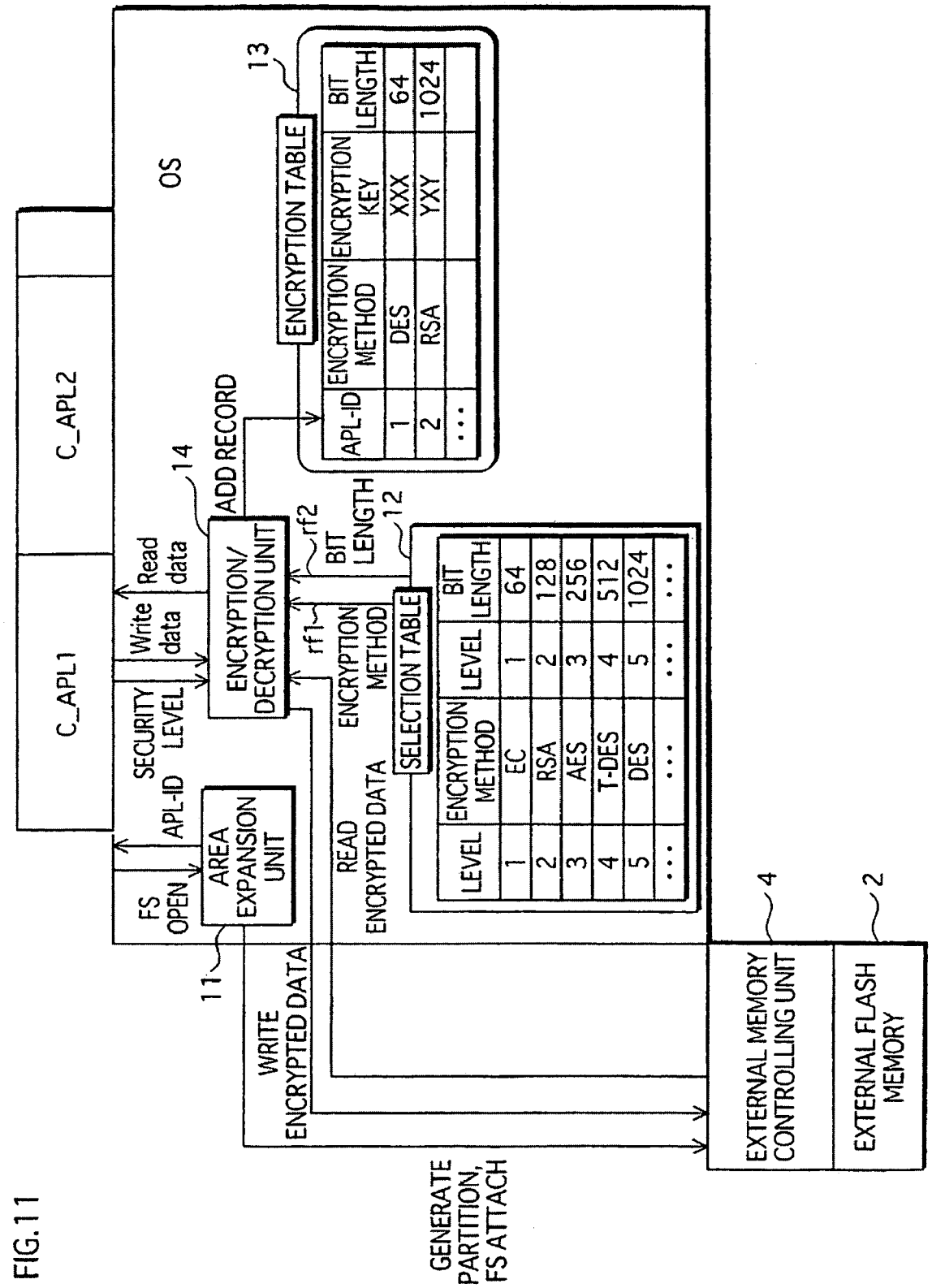
FIG. 11 illustrates an internal structure of an OS 10 according to a second embodiment.

In order to perform the above encryption and decryption, the OS 10 has such a structure illustrated in FIG. 11. As shown in FIG. 11, the OS 10 includes a selection table 12, an encryption table 13, and an encryption/decryption unit 14, in addition to the area expansion unit 11 as in the first embodiment.

The selection table 12 is a table that makes correspondence between bit lengths and encryption methods. A bit length indicates a bit length of an encryption key when generating the encryption key unique to an EC client application. An encryption method indicates an algorithm for encryption using the generated encryption key. The bit lengths and encryption methods correspond one to one to values of 1 to L security levels. A longer bit length and an algorithm with a higher difficulty level correspond to a value of a higher security level, and a shorter bit length and an algorithm with a lower difficulty level correspond to a value of a lower security level. This means that the higher a difficulty level is and the longer a bit length is, the tighter the security of the contents stored in the partition becomes. A degree of security level is in proportional relation with processing time for encryption. Specifically, the higher the difficulty level of encryption and the longer the bit length of the encryption key are, the longer the processing time required for encryption and decryption becomes. On the other hand, the lower the difficulty level of encryption and the shorter the bit length of the encryption key are, the shorter the processing time required for encryption and decryption becomes, and thus the security of the contents stored in the partition becomes looser.

The encryption table 13 is a table that makes correspondence among APL-IDs, the encryption methods, and the bit lengths.

The encryption/decryption unit 14, when the area expansion unit 11 assigns a partition to an EC client application, receives a security level from the EC client application 8, and searches an encryption method and a bit length that correspond to the security level in the selection table 12 (rf1 and rf2 in the drawing), and generates a random number having the length of the searched bit length. The generated random number is assigned to the EC client application as a unique encryption key. A result of assigning is shown in the encryption table 13 ("ADD RECORD" in the drawing). After this, when the EC client application writes data, the encryption/decryption unit 14 encrypts the data received from the EC client application ("WRITE DATA" in the drawing) using the assigned encryption key, and then outputs the encrypted data to the external memory controlling unit 4 ("WRITE ENCRYPTED DATA" in the drawing). When the EC client application reads data, the encryption/decryption unit 14 decrypts the data received from external memory controlling unit 4 ("READ ENCRYPTED DATA" in the drawing) using the assigned encryption key, and then outputs the decrypted data to the EC client application 8 ("READ DATA" in the drawing).

The area expansion unit 11 and the encryption/decryption unit 14 according to the second embodiment are created by having the CPU 7 execute a program written in a computer description language for performing processes in flowcharts shown by FIGS. 12A-C.

FIG. 12A is a flowchart showing processes performed by the area expansion unit 11 and the encryption/decryption unit 14.

Steps S1-S4 in the flowchart in FIG. 12A indicate a process performed by the area expansion unit 11. The area expansion unit 11 assigns a partition number i, which has not been assigned yet, to an EC client application that has requested for an expansion of an area to be used in Step S1, then writes a partition table for an i-th partition to the internal EEPROM 3, and creates a partition in the flash memory 2 in Step S2. In Step S3, the area expansion unit 11 generates a password, and in Step S4, notifies of the generated password as APL-ID to the requesting EC application.

Further, Steps S5-S7 in the flowchart in FIG. 12A indicate a process performed by the encryption/decryption unit 14. In Step S5, the encryption/decryption unit 14 obtains an encryption method and a bit length corresponding to a security level that has been notified of in the expansion request. In Step S6, the encryption/decryption unit 14 generates a random number of the obtained bit length, and in Step S7, adds a record including the obtained encryption method, bit length, and the generated random number to the encryption table.

FIG. 12B is a flowchart showing processes for writing a file performed by the area expansion unit 11 and the encryption/decryption unit 14.

In Step S11, the area expansion unit 11 obtains the APL-ID assigned to the application to perform a file write. In Step S12, the area expansion unit 11 identifies the partition number by the APL-ID, and accepts a setting for parameters buf, file, and fp from the application.

The parameters accepted in this step are as follows.
buf: a pointer to data to be written
file: a name of a target file to which the data to be written
fp: a pointer inside the target file In Step S13, the encryption/decryption unit 14 encrypts the data in buf using an encryption key i based on an encryption method i in the record, and in Step S14, the area expansion unit 11 writes the encrypted data to the file in the partition i, at a part where the file pointer points and after.

FIG. 12C is a flowchart showing processes for reading a file performed by the area expansion unit 11 and the encryption/decryption unit 14. In Step S21, the area expansion unit 11 obtains the APL-ID assigned to the application that performs a file read. In Step S22, the area expansion unit 11 identifies the partition number i by the APL-ID, and in Step S23, accepts a setting for parameters buf, file, fp, and size from the EC client application.

The parameters accepted in Step S23 are as follows.
buf: a pointer to data to be read
file: a name of a target file from which the data to be read
fp: a pointer inside the target file
size: a length of the data to be read In Step S24, the area expansion unit 11 reads the size of the encrypted data in the file in the partition i, at a part where the file pointer points and after. In Step S25, the encryption/decryption unit 14 decrypts the read data using the encryption key i in the encryption method i, and then stores the decrypted data in the buffer.

As described above, according to the present embodiment, the EC client application is able to request the OS 10, considering a relation between the security level and the process time, for the attach specifying the security level as an argument. By doing so, it is possible to notify the OS 10 of how high the EC client application requests for the security level.

In the present embodiment, the security level is received from the EC client application. However, it is also possible that the OS 10 sets the security level automatically. Further, the encryption methods and the bit lengths in the selection table 12 may be up-graded. By doing so, it is possible to increase the secrecy of the secure flash area.

In addition, the selection table 12 and the encryption table 13 may be in an area outside the OS but inside the TRM 1.

Third Embodiment

When an EC client application that is one of a plurality of EC client applications runs on the Java virtual machine 9, the OS 10 recognizes the plurality of EC client applications as one task. In such a case, when switching from a first EC client application to a second EC client application, it could occur that the detach from the first EC client application may not be performed and the second EC client application may access the partition for the first EC client application.

If a person with a malicious intent operates the second EC client application, there is a possibility that the contents stored in the partition for the first EC client application are revealed to this person. In the present embodiment, in order to prevent the stored contents from being revealed, when the switching from the first EC client application to the second EC client application has occurred, the Java virtual machine 9 notifies the area expansion unit 11 of the switching and the APL-ID for the second application.

The area expansion unit 11 performs the detaching of the file system when the switching of the EC client applications is notified from the Java virtual machine 9.

As described above, even in a case in which the EC client applications are recognized as one task when running on the Java virtual machine 9, the Java virtual machine 9 notifies the OS 10 of the switching of the EC client applications, and the detaching of the file system is performed. Accordingly, it does not occur that the contents stored in a partition for one application is revealed by another EC client application.

Fourth Embodiment

In the first to third embodiments, the area recognizable as a file system is assigned on the flash memory 2, and an area table for accessing the file system is stored in the tamper resistant module. In the fourth embodiment, a set of the area recognizable as a file system and the area table is allocated on the flash memory 2.

In addition to allocating the set in the flash memory 2, access information for accessing the file system area is generated in the TRM. In the present embodiment, the access information is location information for accessing the area table, and the encryption key for decrypting the area table.

Figure 13:
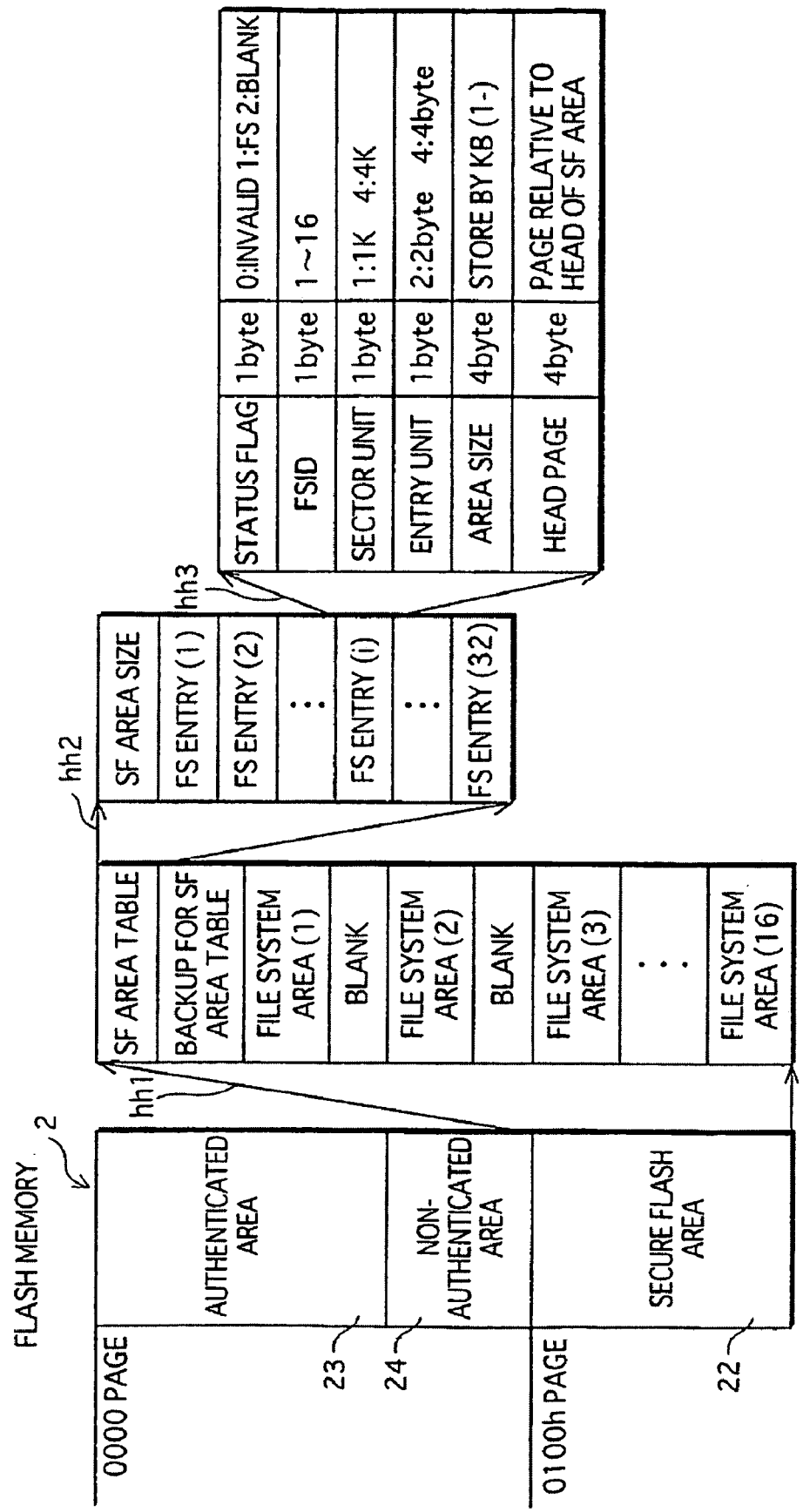
FIG. 13 illustrates an allocation of the flash memory 2 according to a fourth embodiment.

FIG. 13 illustrates an allocation of the flash memory 2 according to the fourth embodiment. In the drawing, the secure flash area is provided after the authenticated area 23 and the non-authenticated area 24. In this embodiment, an access to the memory is performed per page (1 page=512 byte), and the secure flash area is located in 0100h page (h indicates a hexadecimal number).

An outgoing line hh1 is to detail an allocation of the secure flash area in the flash memory 2. As shown by the outgoing line, the secure flash area includes "SF (secure flash) Area Table", "Backup for SF Area Table", and up to 16 "File System Areas (1) to (16)". An outgoing line hh2 is to detail an internal structure of the SF area table. As shown by the outgoing line, the SF area table includes "Secure Flash Area Size" and 32 "FS (File System) Entries (1) to (32)". While a number of file system areas is 16, a number of FS entries is 32 because blank areas between file system areas are also counted.

A size of the SF area table is 388 bytes, and accordingly, a total size of the SF area table and its backup becomes 776 byte. One page corresponds to 512 bytes, so the two SF area table becomes as large as two pages. Given that a head page of the secure flash area is 100h, the file system area (1) starts from 102h.

An outgoing line hh3 is to detail an internal structure of an FS entry [i] of a file system [i], as one example of 16 file systems.

A FS entry includes:

"Status Flag" (1 byte) indicating if the file system [i] is invalid (set as "0"), valid ("1"), or blank ("2"), "FSID" (1 byte) for setting values from 1 to 16 as an identifying number of the file system [i], "Sector Unit" (1 byte) indicating if a sector included in the file system [i] is 1 KB (when set as "1"), or 4 KB (when set as "2"), "Entry Unit" (1 byte) indicating if the FS entry [i] is 2 KB (when set as "2"), or 4 KB (when set as "4"), "Area Size" (4 bytes) indicating an area size of the file system [i], and "Head Page" 1 (4 bytes) indicating a relative number of pages from the SF area head page to the file system [i]. By referring to the "Head Page" of the above FS entry [i], it is possible to access the file system [i].

Figure 14:
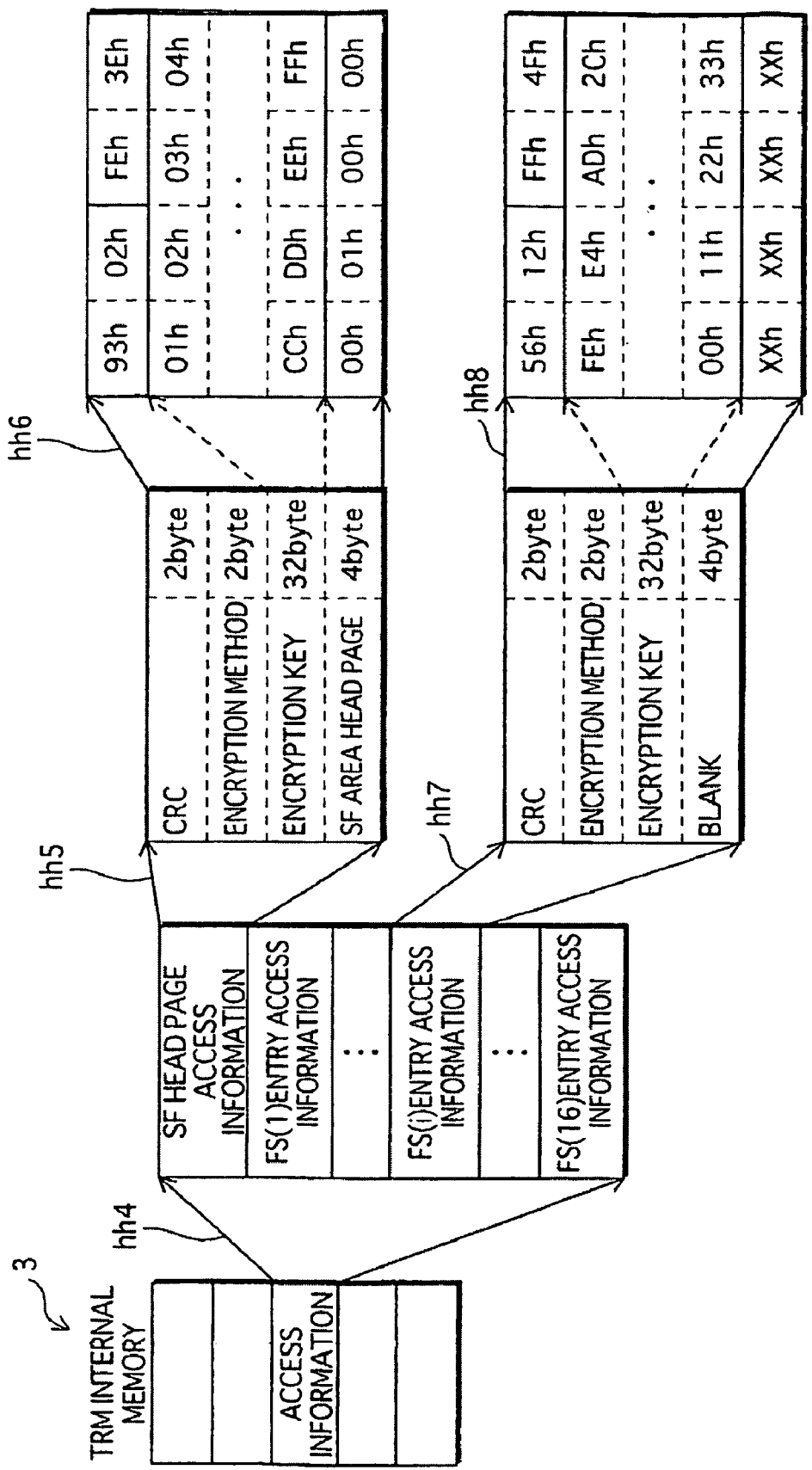
FIG. 14 illustrates an allocation of the TRM internal memory 3 according to the fourth embodiment.

This is the end of the explanation about the allocation of the secure flash area. Next, an allocation of the TRM internal memory 3 is explained. FIG. 14 illustrates the allocation of the TRM internal memory 3 according to the fourth embodiment. A characteristic of the drawing is that the access information to access the SF area table is allocated inside the TRM internal memory 3.

An outgoing line hh4 illustrates an internal structure of the access information. As shown by the outgoing line, the access information includes "SF Head Page Access Information" and "FS Entry Access Information (1) to (16)". An outgoing line hh5 illustrates an internal structure of the SF Head Page Access Information. As shown by the outgoing line, the SF Head Page Access Information includes 2-byte "CRC" relating to the SF area table, 2-byte "Encryption Method" indicating an encryption method and a bit length of an encryption key used for encrypting the SF area table, 32-byte "Encryption Key" used for encrypting the SF area table, and 4-byte "SF Area Head Page" indicating a head page of the secure flash area. In a case in which the head page is FFFF FFFFh, the secure flash area does not exist. In a case in which the head page is other than FFFF FFFFh, the secure flash area starts from the page indicated in the SF Area Head Page. An outgoing line hh6 shows an example of values set for the SF head page access information. In the example, CRC is set at 56h and 12h, the encryption method is set at FEh and 3Eh, the encryption key is set at 01h, 02h, 03h, 04h, . . . , CCh, DDh, EEh, and FFh, and the SF area head page is set at 00h, 001h, 00h, and 00h.

Next, an internal structure of an FS entry access information [i], as an example of 16 FS entry access information. An outgoing line hh7 illustrates a structure of the FS entry access information. The FS entry access information [i] includes 2-byte "CRC", 2-byte "Encryption Method", 32-byte "Encryption Key", and 4-byte "blank data". An outgoing line hh8 shows a specific example of the FS entry access information. In this example, CRC is set at 93h and 02h, the encryption method is set at FFh and 4Fh, and the encryption key is set at FEh, E4h, ADh, 2Ch, . . . , 00h, 11h, 22h, and 33h.

Figure 15:
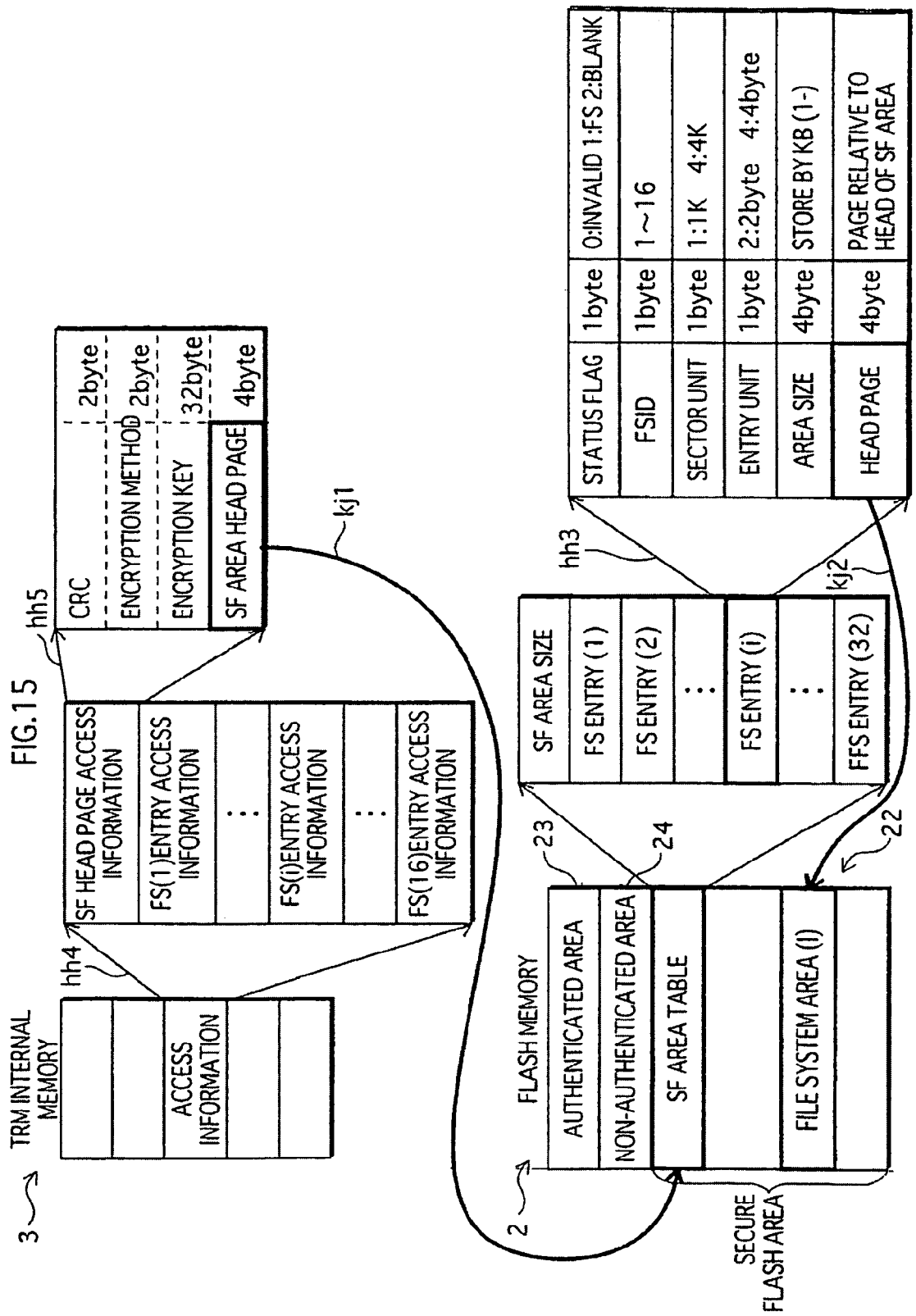
FIG. 15 illustrates a process of an access to a secure flash area according to the fourth embodiment.

FIG. 15 illustrates a process of an access to the secure flash area according to the fourth embodiment. The SF head page access information and the FS entry access information are stored in the TRM internal memory 3, and accordingly, when the OS in the TRM access any part of the secure flash area, the OS accesses the encryption SF area table by referring to the head page in the SF head page access information (kj1 in the drawing), and obtains the SF area table by decrypting the encryption SF area table based on the encryption method and the encryption key taken out of the SF head page access information.

By decrypting the SF area table in the above manner, it is possible to access the head page in the file system area [i] by referring to the FS entry [i] included in the SF area table (kj2 in the drawing). Further, the encryption key and method for each file system area are indicated in the FS entry access information in the TRM internal memory 3, and therefore it is possible to obtain the stored contents in the secure flash area, using the encryption key and method, by decrypting encrypted data read from any of the file system area.

In the allocations in FIGS. 13 and 14, while the encryption partition table is located in the secure flash memory, the SF head page access information and the FS entry access information are stored in the TRM. Therefore, even when the SDeX card is connected to a device, the device is not able to read the SF head page access information and the FS entry access information stored in the TRM, and data of the encryption partition table does not make any sense to the device. Thus, the secrecy of the secure flash area is maintained.

Figure 16:
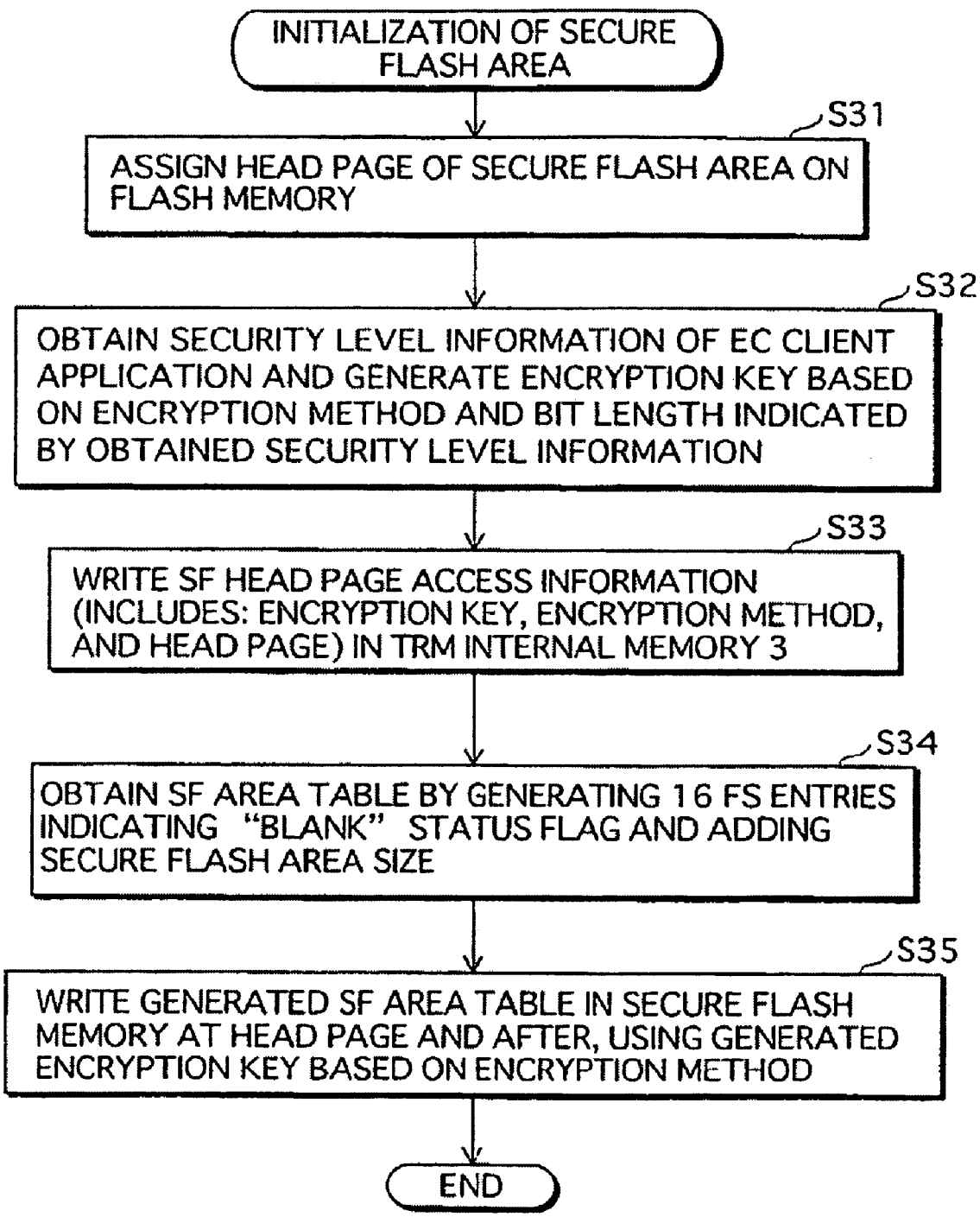
FIG. 16 is a flowchart showing an order of a process by the OS 10 when initializing the secure flash area.

An access to the above explained secure flash area is realized by creating a program in which processes shown in FIGS. 16-19 are described, and having the CPU 7 execute the program. FIG. 16 is a flowchart showing an order of processes by the OS 10 when initializing the secure flash area. In this flowchart, the OS 10 assigns the head page of the secure flash area on the secure flash memory 2 (Step S31), and obtains security level information of the EC client application. The security level information includes an encryption method and a bit length indicating the security level of the EC client application. Here, as in the second embodiment, the encryption method indicates an algorithm for encryption to be used for the EC client application, and the bit length indicates a bit length of an encryption key to be used for the EC client application.

Then, the OS 10 generates an encryption key based on the obtained encryption method and bit length (Step S32), writes the SF head page access information (includes: the encryption key, the encryption method, and the head page) to the TRM internal memory 3 (Step S33), obtains the SF area table by generating 16 FS entries indicating "blank" status flag and adding the secure flash area size (Step S34), and writes the generated SF area table in the secure flash memory 2 at the head page and after, after encrypting using the generated encryption key and based on the encryption method (Step S35). By the above process, the initialization of the secure flash area is completed.

Figure 17:
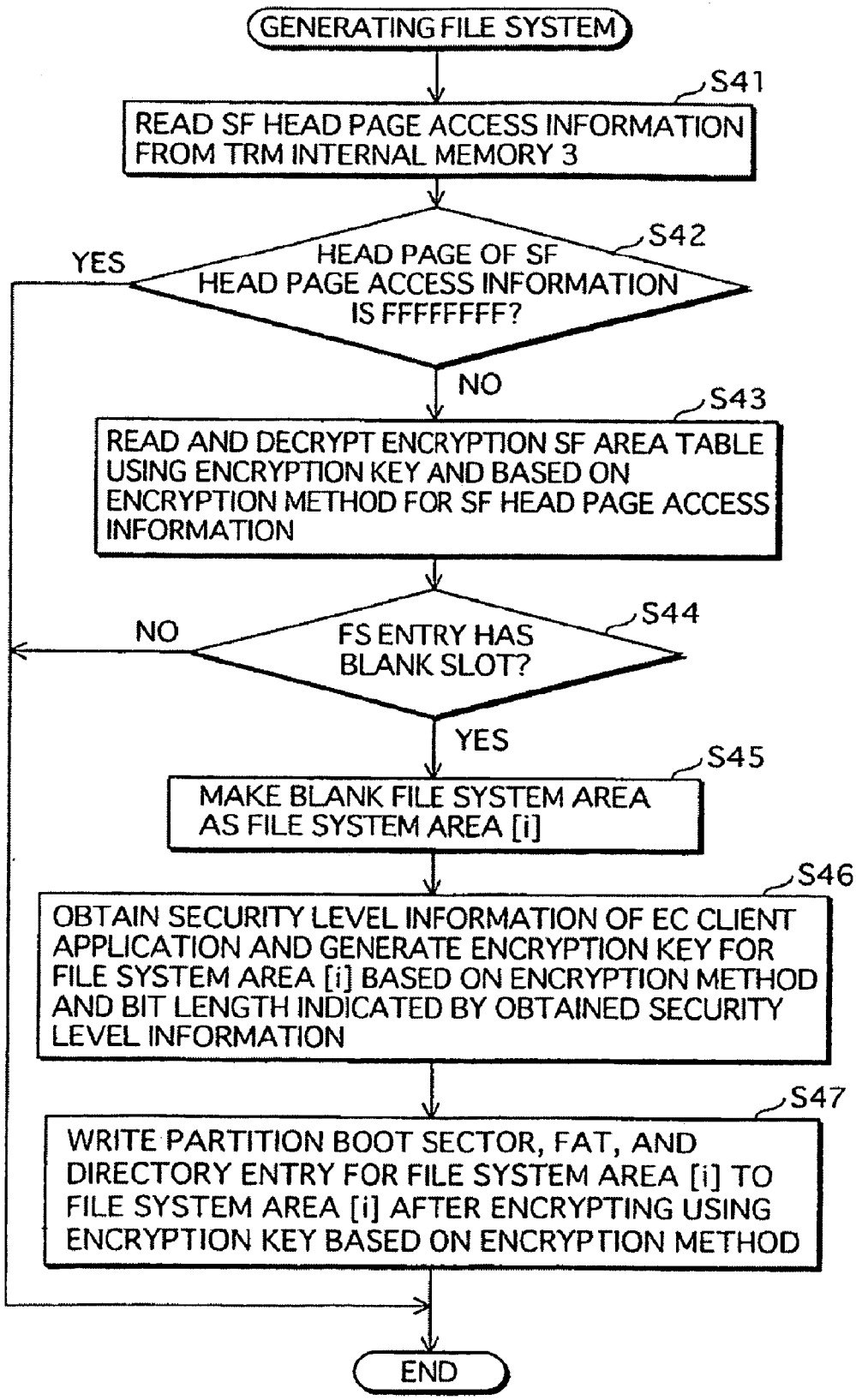
FIG. 17 is a flowchart showing an order of a process by the OS 10 when generating a file system.

FIG. 17 is a flowchart showing an order of processes by the OS 10 when generating a file system. In this flowchart, the OS 10 reads the SF head page access information from the TRM internal memory 3 (Step S41), and judges whether the head page of the SF head page access information is FFFFFFFF (Step S42). If a result of the judging is affirmative, the flowchart ends without performing further steps. If the result indicates a valid value, the OS 10 reads and decrypts the encryption SF area table using the encryption key and based on the encryption method for the SF head page access information (Step S43), and judges whether the FS entry has a blank slot (Step S44). If there is no blank slot, then the flowchart ends without performing further steps.

If there is any blank slot, the OS 10 makes a blank file system area as a file system area [i] (Step S45), obtains security level information of the EC client application and generates an encryption key for the file system area [i] based on the encryption method and bit length included in the obtained security level information (Step S46), writes the partition boot sector, the FAT, and a direct entry for the file system area [i] to the file system area [i] after encrypting using the encryption key based on the encryption method (Step S47). By this, one file system area is generated in the secure flash memory 2.

Figure 18:
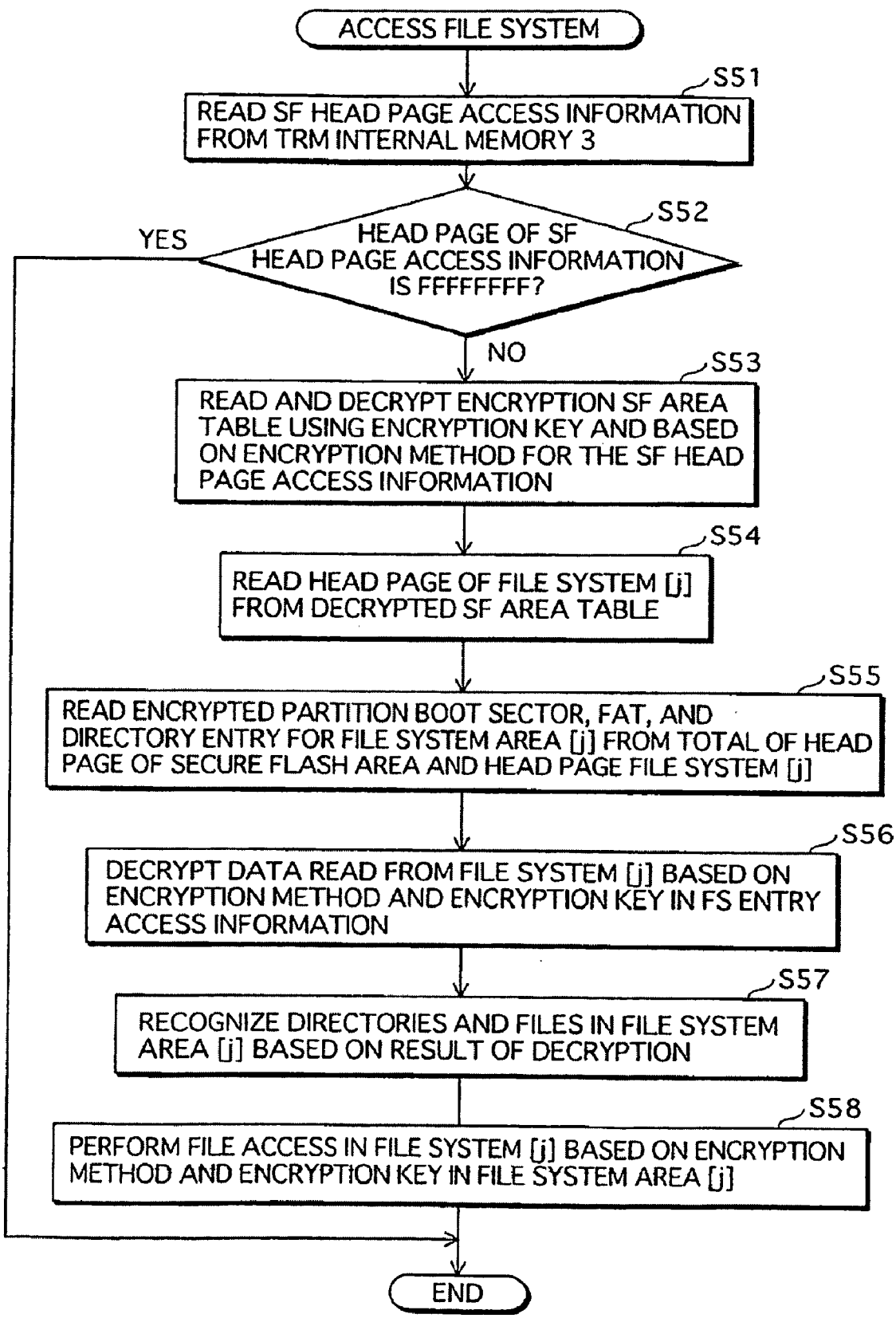
FIG. 18 is a flowchart showing an order of a process by the OS 10 when accessing the file system.

FIG. 18 is a flowchart showing an order of processes by the OS 10 when accessing the file system. In this flowchart, the OS 10 reads the SF head page access information from the TRM internal memory 3 (Step S51), and judges whether the head page of the SF head page access information is FFFFFFFF (Step S52). If a result of the judging is affirmative, the flowchart ends without performing further steps. If the result indicates a valid value, the OS 10 reads and decrypts the encryption SF area table using the encryption key and based on the encryption method for the SF head page access information (Step S53). The OS 10 reads the head page of the file system [j] from the decrypted SF area table (Step S54), and reads the encrypted partition boot sector, FAT, and direct entry for the file system area [j] from a total of the head page of the secure flash area and the head page of the file system [j] (Step S55). Then, the OS 10 decrypts the data read from the file system [j] based on the encryption method and encryption key in the FS entry access information (Step S56), recognizes directories and files in the file system area [j] based on the result of the decryption (Step S57), and performs the file access in the file system [j] based on the encryption method and encryption key in the file system area [j] (Step S58).

Figure 19:
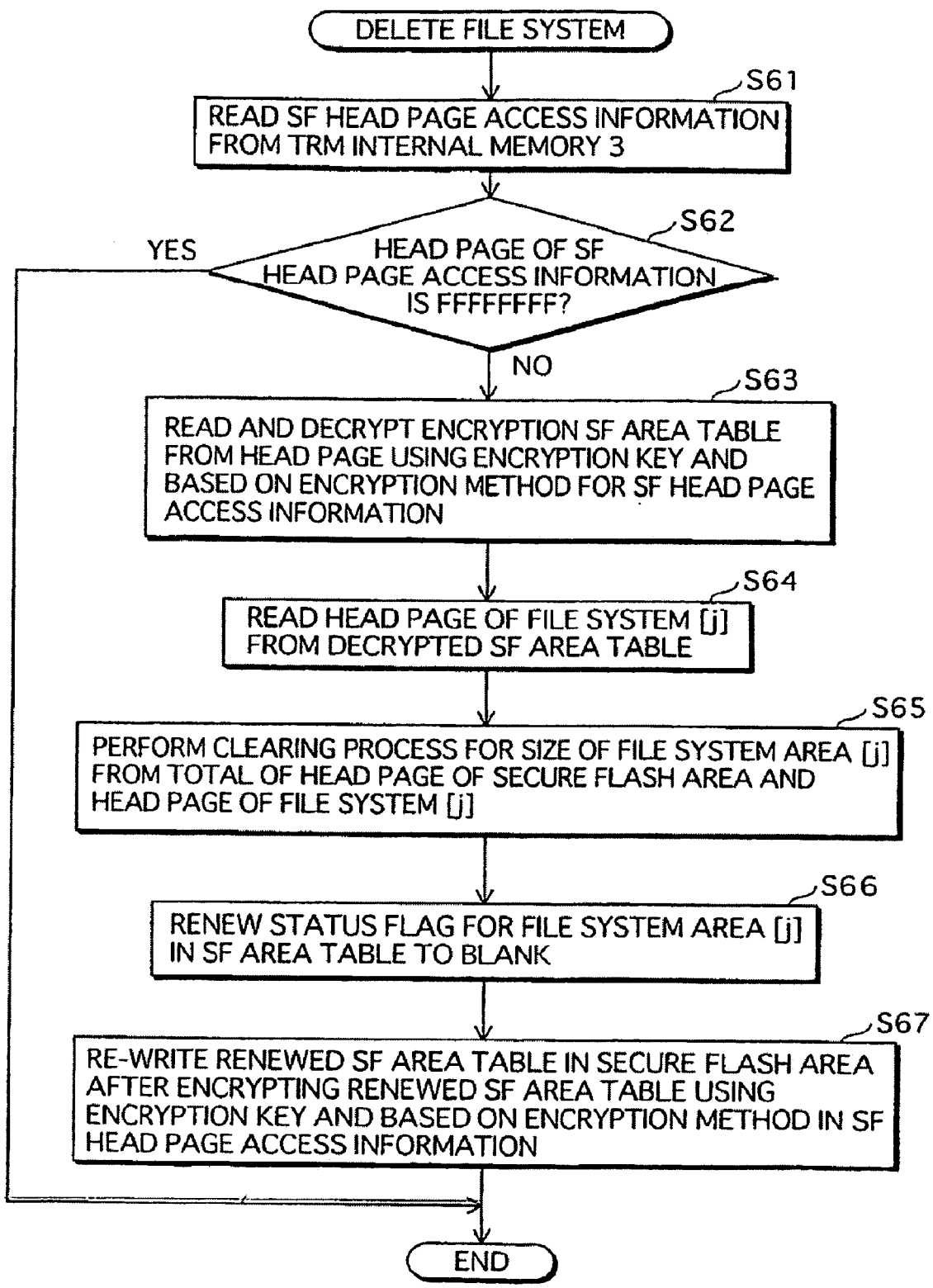
FIG. 19 is a flowchart showing an order of processes by the OS 10 when deleting the file system.

FIG. 19 is a flowchart showing an order of processes by the OS 10 when deleting the file system. In this flowchart, the OS 10 first reads the SF head page access information from the TRM internal memory 3 (Step S61), and judges whether the head page of the SF head page access information is FFFFFFFF (Step S62). If a result of the judging is affirmative, the flowchart ends without performing further steps. If the result indicates a valid value, the OS 10 reads and decrypts the encryption SF area table from the head page of the secure flash area using the encryption key and based on the encryption method for the SF head page access information (Step S63). The OS 10 then reads the head page of the file system [j] from the decrypted SF area table (Step S64), and performs a clearing process for a size of the file system area [j] from the total of the head page of the secure flash area and the head page of the file system [j] (Step S65). Then, the OS 10 renews the status flag for the file system area [j] in the SF area table to the blank status (Step S66), and re-writes the renewed SF area table in the secure flash area after encrypting the renewed SF area table using the encryption key and based on the encryption method in the SF head page access information (Step S67). By the above steps, the clearing of the file system [j] is completed.

As described above, according to the present embodiment, the encryption SF area table is located in the secure flash memory, with the SF head page access information that includes the information indicating the location of the SF area table, the encryption key, and the encryption method allocated in the TRM. Accordingly, only the OS in the TRM is able to recognize the file system area in the secure flash memory. By providing the file system area which is accessible only by the OS in the TRM in the secure flash area, it is possible to expand the usage area that the EC client application uses with maintaining the secrecy of the stored content.

Fifth Embodiment

Figure 20:
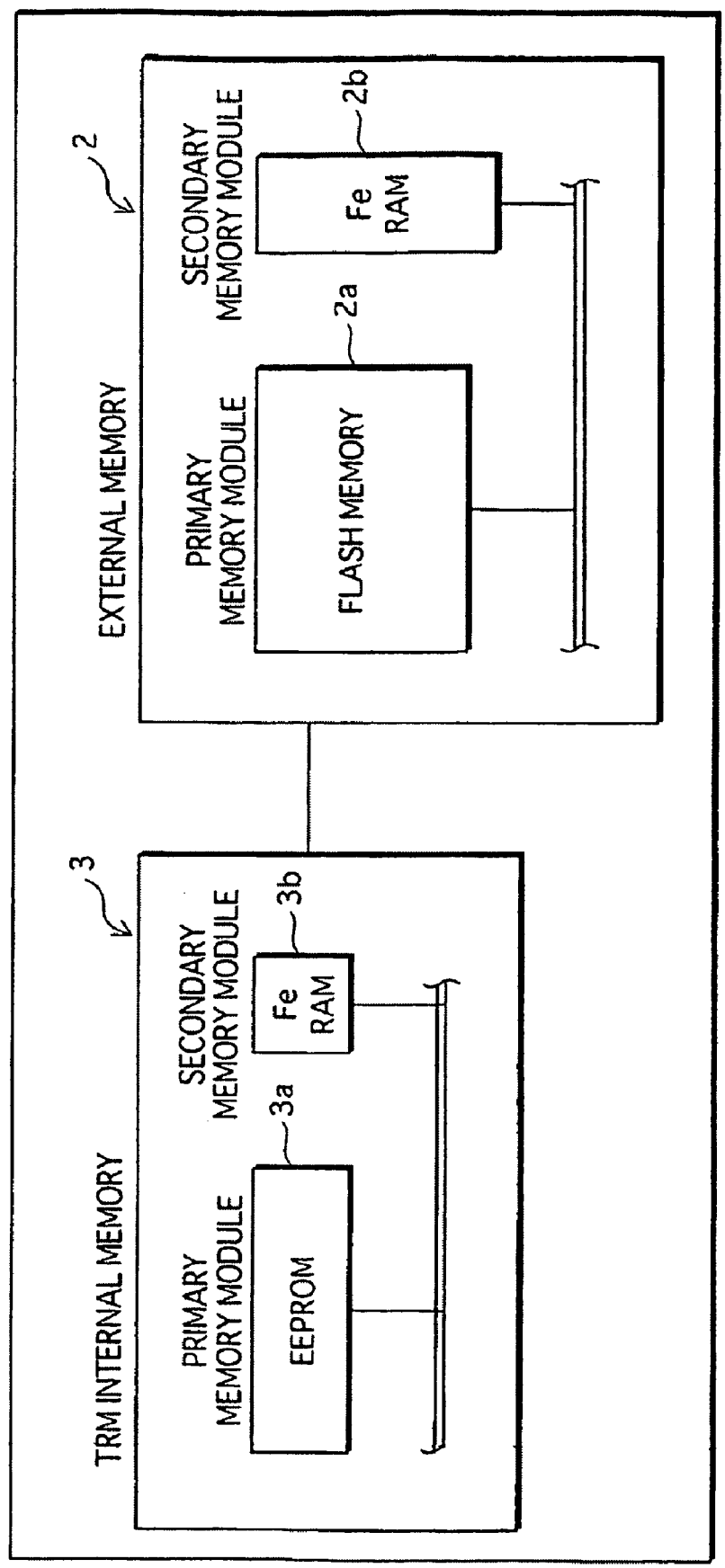
FIG. 20 illustrates a structure of a memory module according to a fifth embodiment.

In the first to fourth embodiments, the TRM internal memory 3 and the external memory 2 are a EEPROM and a flash memory, respectively. In a fifth embodiment, each of the TRM internal memory 3 and the external memory 2 includes two memory modules. FIG. 20 illustrates a structure of the memory modules according to the fifth embodiment. In the drawing, an EEPROM 3a and a flash memory 2a are primary memory modules, and the same as the memories described in the first to fourth embodiments. In the fifth embodiment, secondary memory modules 2b and 3b are provided to the external memory 2 and internal memory 3, respectively. The secondary memory modules 2b and 3b are made of Ferroelectric Random Access Memory (FeRAM), and performance of the FeRAM greatly differs from the flash memory. FIG. 21 is a table for performance comparison between the flash memory and the FeRAM. The table shows that the flash memory is low-cost, and suitable for memories with a larger capacity (○ in the table), but only able to be written by a block (✕1). A size of one block becomes larger as the capacity of the flash memory becomes larger, and accordingly a loss could be greater when a small size of data is written to the flash memory. Further, write time is long (10000 ns), and a number for rewrite times is small (1,000,000 times). Moreover, write performance is unstable because when the write is performed, data already stored is deleted once and then re-written.

On the other hand, the FeRAM is expensive and not suitable for memories with a larger capacity (Δ in the table), but is able to be written by a byte, and at a high speed (30-100 ns). Further, it is possible to re-write an increased number of times.

Figure 22:
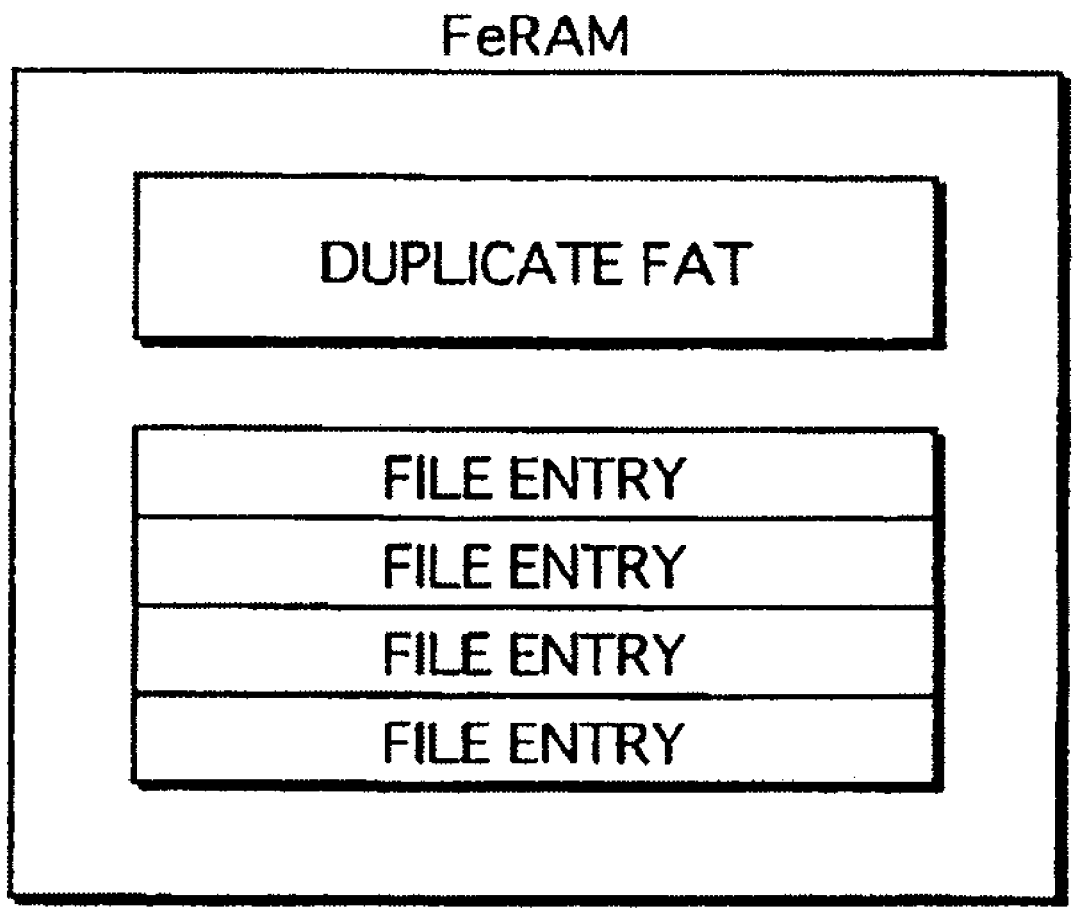
FIG. 22 illustrates the FeRAM assigned with data that is frequently renewed, such as a file entry, FAT, and a clear process managing table.

Because of the above differences in performance, it is possible to cover the write performance of the flash memory by using a secondary memory module of the FeRAM and stores data that is frequently renewed, such as file entries and FAT, in the secondary memory module. FIG. 22 illustrates the FeRAM assigned with the data that is frequently renewed, such as file entries, FAT, and a clear process managing table.

As described above, the data that is small in size and frequently renewed, such as file entries and FAT, are stored in the secondary memory module made of the FeRAM, and thus, it is possible to realize a high speed re-writing of the data such as file entries and FAT.

Another characteristic of the FeRAM is that data stored in the FeRAM can be read only once. This means that the data stored in the FeRAM will be destructed after the data is read (✕4). Such a characteristic is desirable in terms of maintaining the secrecy, but the number of re-write times increases as a result because it becomes necessary to write the data again when the data is read. In order to cover the characteristic of destructive read, it is desirable to use Magnetoresistive Random Access Memory (MRAM).

Sixth Embodiment

Figure 23:
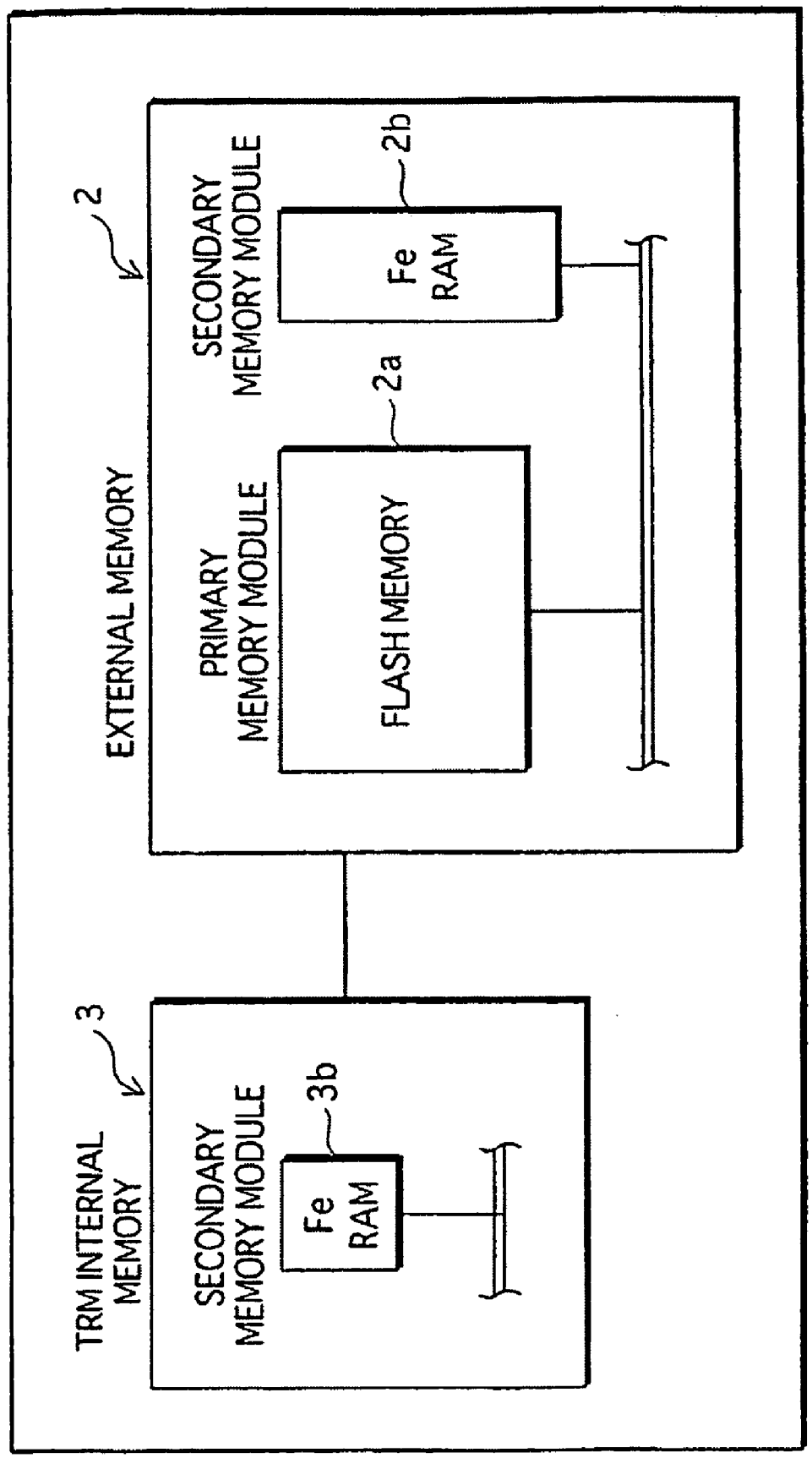
FIG. 23 illustrates an internal structure of the TRM internal memory 3 according to a sixth embodiment.

In the fifth embodiment, the secondary memory module in the internal memory 3 is made of FeRAM. In a sixth embodiment, however, the internal memory 3 in the tamper resistant module is made of FeRAM. FIG. 23 illustrates an internal structure of the TRM internal memory 3 according to the sixth embodiment. The TRM internal memory 3 is small in size, and therefore it does not increase the production cost too much. Note that, although the TRM internal memory 3 of the sixth embodiment is made of FeRAM, it is also desirable that the TRM internal memory 3 is made only of MRAM.

Seventh Embodiment

In the first embodiment, the EC client application is stored, in advance, in the Mask ROM 6. A seventh embodiment, however, relates to an improvement in which an EC client application may be downloaded from the EC server 100 and recorded in the SDeX card.

The TRM internal memory 3 according to the seventh embodiment is provided with an area for downloaded EC client applications. When the SD portable device downloads a new EC client application from the EC server 100, the new EC client application is stored in the area for downloaded EC client applications.

One of usage areas that have been secured in advance is assigned to the newly downloaded EC client application. The area expansion unit 11 assigns one of the file systems in the flash memory 2 to the downloaded EC client application, when the new EC client application is added after the download. The file system assigned to the downloaded EC client application is unique to the downloaded EC client application, and other EC client applications are not able to access the file system. The EC client application is able to perform file access freely in the file system that is a closed space.

As described above, according to the present embodiment, the area expansion unit 11 assigns the file system to the downloaded EC client application when the new EC client application is added to the SDeX card. Accordingly, the downloaded EC client application is able to use the area on the SDeX card just enough.

In order to assign a unique file system to the downloaded EC client application, it is desirable to reserve usage areas in advance, for EC client applications to be downloaded in the future.

Additional Explanations for First to Seventh Embodiments (A) Although the EC applications are explained as an example of applications, the EC applications may be other kind of applications. The EC applications may be server applications on servers operated by transportation companies, such as railways, airlines, buses, and highways, and client applications corresponding to the server applications. By this, it is possible to utilize the SDeX memory card 400 for such as examining tickets and boarding procedures.

Moreover, the EC applications may also be server applications on servers operated by national and local public offices. By this, it is possible to utilize the SDeX memory card 400 for such as registration and issuance of various certificates such as of residence.

(B) Data processing as shown in FIGS. 12A-12C is realized by using hardware resources such as the CPU and the EEPROM. Specifically, the SDeX memory card as described in the first to seventh embodiments are structured by collaboration of the program and the hardware in which data processing is performed in accordance with the intended use.

Because the data processing by the program is practically realized using the hardware resources, the program whose processes are shown in the flowchart is considered to be a creation of technical ideas utilizing natural laws, and therefore considered to be an invention as the program alone. The processes shown in FIGS. 12A-12C discloses examples of practical works of the program according to the present invention.

In the first to the seventh embodiments, the practical examples of the program are described as the program installed in the SDex memory card 400. However, it is also possible that the program alone is put into practice, separated from the SDeX memory card 400. Examples of the practical uses of the program alone include (i) manufacturing the program, (ii) transferring the program regardless of whether or not compensation is received, (iii) lending the program, (iv) importing the program, (v) providing the program via a bi-directional electronic communication line regardless of whether or not compensation is received, (vi) offering transferring or lending of the program to general users by storefront display, catalog invitation, distribution of brochure, and such.

The example (v) of the practical uses about providing the program via a bi-directional electronic communication line includes (a) a provider sends the program to a user and has the user use (program download service), and (b) only functions of the program are provided to the user via the electronic communication line and the program itself remains on the provider side (Function Providing ASP service).

(C) An element of "time" in the steps in the flowcharts in FIGS. 12A-12C that are performed chronologically is considered to be essential. Accordingly, it becomes clear that the processes in the flowcharts disclose practical uses of a controlling method. The processes shown in the flowcharts are embodiments of the practical uses of the controlling method according to the present invention. Because the intended object of the present invention is achieved by performing each step chronologically, it is clear that the processes shown in the flowcharts are considered to be the practical uses of the method of controlling the semiconductor memory card according to the present invention.

(D) In the first to seventh embodiments, the nonvolatile memories in and outside the tamper resistant memory are explained as the EEPROM. However, other nonvolatile memories such as FeRAM may also be used.

(E) Although the SD portable device 300 is explained as a cellular telephone type as an example, the SD portable device 300 maybe portable audio devices for commercial use, Set Top Boxes (STBs), or mobile phones.

(F) Although the annual transaction schedule is taken as an example of secure data that has a value next to money, other kind of data that requires secrecy may be used, such as information about frequent flier, shopping coupon, and trade secrets.

(G) Although the area expansion unit 11 assigns partitions as the file system unique to the EC client application, other kinds of logical areas may be used as file system areas unique to the EC client applications. For example, one directory may be a file system area for one EC client application.

INDUSTRIAL APPLICABILITY

A semiconductor memory card according to the present invention is suitable for storing various kinds of data that require secrecy because it is possible to expand a secure area, and has a greater applicability in various fields such as consumer industry.

The invention claimed is:

1. A semiconductor memory card comprising a tamper resistant module and a nonvolatile memory that is not tamper resistant, wherein
the tamper resistant module includes:
an internal memory having a usage area used by a program stored in the tamper resistant module; and
a processing unit operable to (i) assign an area in the nonvolatile memory to the program, and (ii) generate, in the internal memory of the tamper resistant module, access information for the assigned area, the usage area and the assigned area thereby composing a total area for use by the program,
the internal memory stores a first area table indicating a location and a size of the usage area, and a second area table indicating a location and a size of the assigned area, and
the access information is the second area table.

2. The semiconductor memory card according to claim 1, wherein
the processing unit comprises:
an assigning unit operable to assign, at a time of the generation of the access information,
an encryption key which the program uses in accessing the assigned area;
an encrypting unit operable, at a time of the program writing data to the assigned area, to encrypt the data; and
a decrypting unit operable, at a time of the program reading data from the assigned area, to decrypt the data.

3. The semiconductor memory card according to claim 2, wherein
the processing unit further comprises:
a receiving unit operable to receive a security level from the program; and
a storage unit that stores values for different security levels, bit lengths of an encryption key, and encryption methods, the bit lengths and encryption methods corresponding one-to-one to the values,
the encryption key assigned by the assigning unit is generated based on a bit length corresponding to the received security level, and
the encryption and decryption by the encrypting unit and decrypting unit, respectively, are performed based on an encryption method corresponding to the received security level.

4. The semiconductor memory card according to claim 1 being a multi-application memory card, wherein
the program is one of a plurality of applications with which the memory card is compatible, and
the internal memory has a plurality of usage areas corresponding one to one to the applications.

5. The semiconductor memory card according to claim 4, wherein
at a time of addition of an application to the memory card, the processing unit assigns an area to be used by the added application.

6. The semiconductor memory card according to claim 1, wherein
the assigned area is a file system in which files are stored.

7. The semiconductor memory card according to claim 1, wherein
the tamper resistant module includes a CPU that executes the program.

8. The semiconductor memory card according to claim 1 including a host interface which is an interface with a device connected to the memory card, wherein
the host interface judges whether a command from the device is an expansion command, and
the program starts, if the command is judged to be the expansion command.

9. The semiconductor memory card according to claim 1 including a plurality of file systems, a secure level of each of the file systems being one of high, medium, and low, wherein
a first file system whose secure level is high is stored in the tamper resistant module,
a second file system whose secure level is low is stored in the nonvolatile memory that is not tamper resistant, and
the total area that is a combination of the usage area in the tamper resistant module and the assigned area in the nonvolatile memory that is not tamper resistant composes a third file system whose secure level is medium.

10. A controlling program in a semiconductor memory card that comprises a tamper resistant module and a nonvolatile memory that is not tamper resistant, and that is executed by a CPU in the tamper resistant module, wherein
the tamper resistant module includes:
an internal memory having a usage area used by an application stored in the tamper resistant module,
the controlling program is operable to (i) assign an area in the nonvolatile memory that is not tamper resistant to the application, and (ii) generate, in the internal memory of the tamper resistant module, access information for the assigned area, the usage area and the assigned area thereby composing a total area for use by the application,
the internal memory stores a first area table indicating a location and a size of the usage area, and a second area table indicating a location and a size of the assigned area, and
the access information is the second area table.

* * * * *